(12) United States Patent
Mochinushi

(10) Patent No.: US 9,778,452 B2
(45) Date of Patent: Oct. 3, 2017

(54) SIGHTING DEVICE

(71) Applicant: Olympus Corporation, Shibuya-ku, Tokyo (JP)

(72) Inventor: Hidenobu Mochinushi, Tokyo (JP)

(73) Assignee: Olympus Corporation, Tokyo (JP)

( * ) Notice: Subject to any disclaimer, the term of this patent is extended or adjusted under 35 U.S.C. 154(b) by 52 days.

(21) Appl. No.: 14/990,281

(22) Filed: Jan. 7, 2016

(65) Prior Publication Data
US 2016/0223806 A1 Aug. 4, 2016

(30) Foreign Application Priority Data
Feb. 4, 2015 (JP) ................................ 2015-020623

(51) Int. Cl.
| | | |
|---|---|---|
| *G02B 27/32* | (2006.01) | |
| *G02B 23/10* | (2006.01) | |
| *G02B 23/14* | (2006.01) | |
| *G02B 27/34* | (2006.01) | |
| *G03B 13/04* | (2006.01) | |
| *G02B 27/36* | (2006.01) | |
| *G03B 13/08* | (2006.01) | |
| *G03B 17/56* | (2006.01) | |

(52) U.S. Cl.
CPC ........... *G02B 23/105* (2013.01); *G02B 23/14* (2013.01); *G02B 27/34* (2013.01); *G02B 27/36* (2013.01); *G03B 13/04* (2013.01); *G03B 13/08* (2013.01); *G03B 17/565* (2013.01)

(58) Field of Classification Search
CPC ........ G02B 23/10; G02B 27/36; G02B 23/14; G02B 27/34; G02B 23/105; G02B 23/02; G03B 13/04; G03B 13/08; G03B 17/565; F41G 1/34; F41G 1/467; F41G 1/30
See application file for complete search history.

(56) References Cited

U.S. PATENT DOCUMENTS

| | | | | |
|---|---|---|---|---|
| 5,577,326 | A | * 11/1996 | Montelin | ................. F41G 1/16 356/251 |
| 6,327,806 | B1 | * 12/2001 | Paige | ....................... F41G 1/30 42/113 |
| 2010/0077646 | A1 | * 4/2010 | Gaber | .................... F41G 1/467 42/123 |

FOREIGN PATENT DOCUMENTS

| | | |
|---|---|---|
| JP | 08-504029 | 4/1996 |
| JP | 2001-500990 | 1/2001 |

(Continued)

*Primary Examiner* — Jamil Ahmed
(74) *Attorney, Agent, or Firm* — John C. Pokotylo; Straub & Pokotylo

(57) ABSTRACT

A sighting device, including an optical element having a concave reflection surface and an aiming light source and forming in a visual field frame, comprises a main-body housing section that houses the optical element and the aiming light source and has an opening on an upper surface side, a cover member that covers the upper surface side of the main-body housing section, and a link mechanism that couples the main-body housing section and the cover member and moves the cover member with respect to the main-body housing section. The cover member is moved by the link mechanism between a closed position where the cover member covers the opening of the main-body housing section and an open position where the cover member is disposed in a position separated from the opening of the main-body housing section and forms an optical path of the aiming light.

12 Claims, 19 Drawing Sheets

(56) References Cited

FOREIGN PATENT DOCUMENTS

| | | |
|---|---|---|
| JP | 2012-202573 | 10/2012 |
| JP | 2012-229844 | 11/2012 |

\* cited by examiner

SIGHTING DEVICE

CROSS REFERENCE TO RELATED APPLICATION

This application claims the benefit of Japanese Application No. 2015-020623 filed in Japan on Feb. 4, 2015, the contents of which are incorporated herein by this reference.

BACKGROUND OF THE INVENTION

1. Field of the Invention

The present invention relates to an external sighting device mounted on an image pickup apparatus, various optical apparatuses, and the like to be used.

2. Description of the Related Art

It has been known that it is difficult to quickly and surely introduce a desired target of image pickup or observation into an image pickup visual field or an observation visual field because the image pickup visual field or the observation visual field is narrow, for example, when an image pickup target object (an object) present at a far distance is enlarged and subjected to image pickup using an image pickup apparatus such as a camera (including a digital camera and a digital video camera) or when an observation target object present at a far distance is enlarged and observed using various optical apparatuses for observation such as a telescope (including a field scope, a spotting scope, and binoculars).

Therefore, there have been proposed and put to practical use various means for enabling an object or an observation target object to be easily introduced into a visual field by attaching sighting devices of forms disclosed in, for example, Japanese Patent Application Laid-Open Publication No. H8-504029, Japanese Patent Application Laid-Open Publication No. 2001-500990, Japanese Patent Application Laid-Open Publication No. 2012-202573, and Japanese Patent Application Laid-Open Publication No. 2012-229844 to an image pickup apparatus, various optical apparatuses, or the like and using the sighting devices.

SUMMARY OF THE INVENTION

A sighting device according to an aspect of the present invention is a sighting device including an optical element having a concave reflection surface and an aiming light source that emits aiming light toward the concave reflection surface of the optical element, the sighting device forming a light point of the aiming light emitted from the aiming light source in a visual field frame, the sighting device including: a main-body housing section that houses the light source element and the aiming light source and has an opening on an upper surface side; a cover member that covers the upper surface side of the main-body housing section; and a link mechanism that couples the main-body housing section and the cover member and moves the cover member with respect to the main-body housing section. The cover member is moved by the link mechanism between a closed position where the cover member covers the opening on the upper surface side of the main-body housing section and an open position where the cover member is disposed in a position separated from the opening on the upper surface side of the main-body housing section to lie above the main-body housing section and forms an optical path opening along an optical path of the aiming light emitted from the aiming light source on an inside of the main-body housing section.

Benefits of the present invention will be made more apparent from the following detailed explanation.

DETAILED DESCRIPTION OF THE PREFERRED EMBODIMENTS

Embodiments of the present invention are explained below with reference to the drawings. Each of drawings referred to in the following explanation are schematic. Dimension relations, scales, and the like of each of members are sometimes shown differently for each of components in order to show each of the components in recognizable sizes on the drawings. Therefore, concerning numbers of components shown in each of the drawings, shapes of the components, ratios of sizes of the components, relative positional relations among each of the components, and the like, the present invention is not limited to only forms shown in the figures.

Note that, in the present embodiment, a surface opposed to a target object during use of a sighting device applied with the present invention is referred to as a front surface. A surface that a user faces during use of the sighting device is referred to as a rear surface. On the other hand, a surface of the sighting device on which an upper cover member is disposed is referred to as an upper surface. A surface opposed to an upper surface of the sighting device is referred to as a bottom surface. On the other hand, both side surfaces of the sighting device in a use state are respectively referred to as a left side surface and a right side surface. Concerning distinction of left and right in this case, a right side and a left side of the user facing a front surface of the sighting device from the target object side during use of the sighting device are respectively referred to as left and right and distinguished.

[Explanation of the Drawings]

Figure 1:
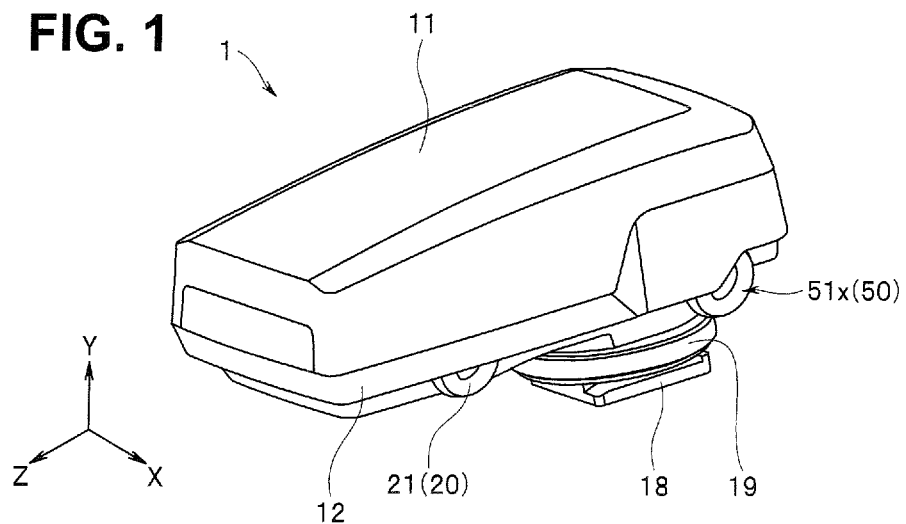
FIG. 1 is a perspective view showing an overall configuration of a form (a cover closed state) during nonuse of a sighting device of an embodiment of the present invention.
Figure 2:
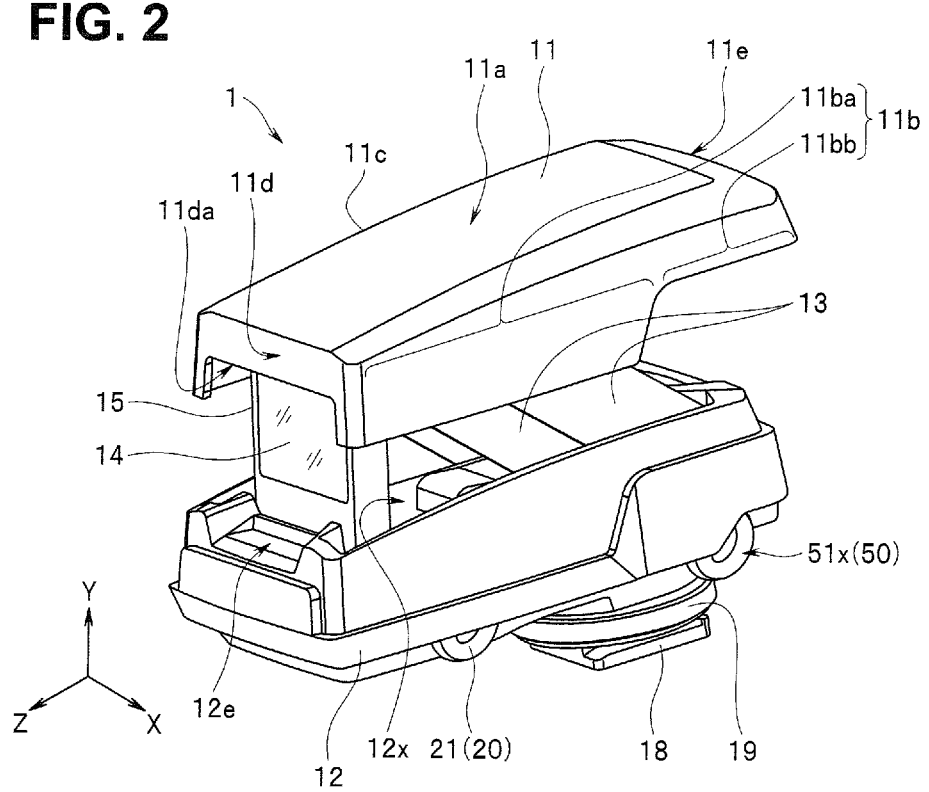
FIG. 2 is a perspective view showing an overall configuration of a form (a cover open state) during use of the sighting device of the embodiment of the present invention.
Figure 3:
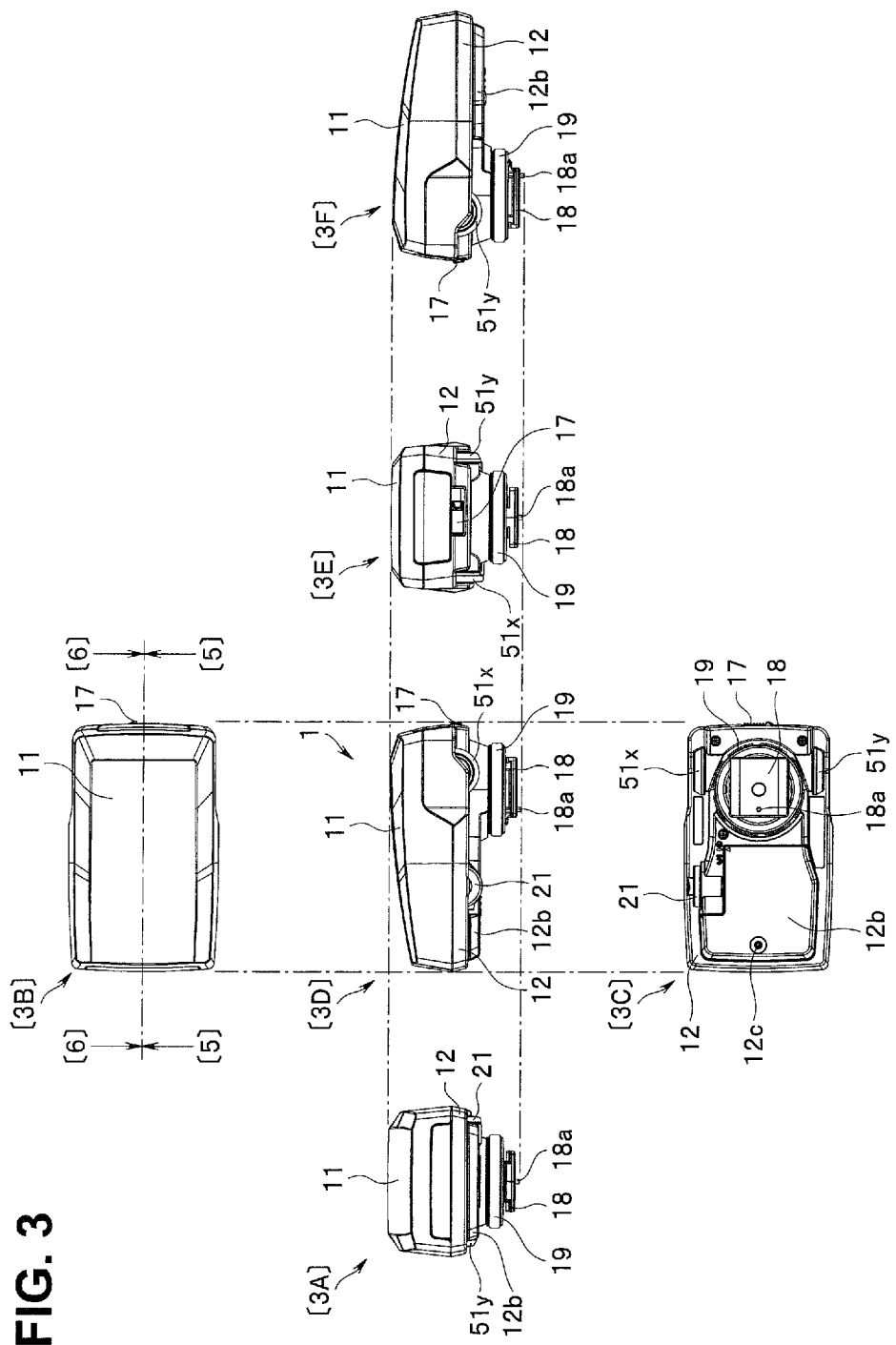
FIG. 3 shows six view drawings of the form (the cover closed state) during nonuse of the sighting device of the embodiment of the present invention.
Figure 4:
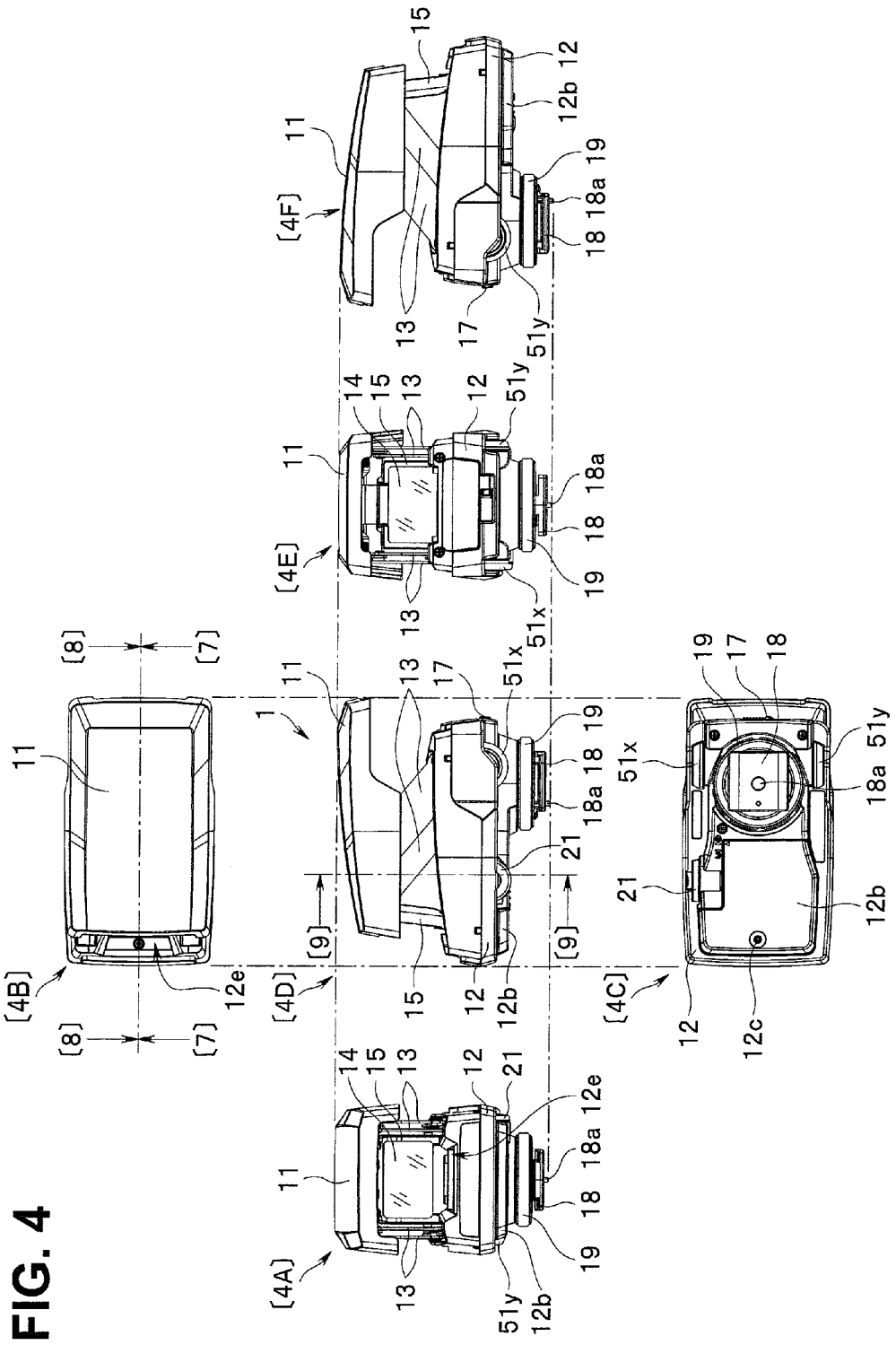
FIG. 4 shows six view drawings of the form (the cover open state) during use of the sighting device of the embodiment of the present invention.

FIGS. 1 to 4 are diagrams showing an overall configuration of a sighting device of an embodiment of the present invention. Among the figures, FIGS. 1 and 2 are perspective views showing the sighting device of the embodiment of the present invention. FIG. 3 and FIG. 4 show six view drawings of the sighting device of the present embodiment. Note that FIG. 1 and FIG. 3 show a form (a cover closed state) during nonuse of the sighting device. FIG. 2 and FIG. 4 show a form (a cover open state) during use of the sighting device. Note that, in FIG. 3 and FIG. 4, signs [3A] and [4A] indicate a front view, signs [3B] and [4B] indicate a top view, signs [3C] and [4C] indicate a bottom view, signs [3D] and [4D] indicate a right side view, signs [3E] and [4E] indicate a rear view, and signs [3F] and [4F] indicate a left side view, respectively.

Figure 5:
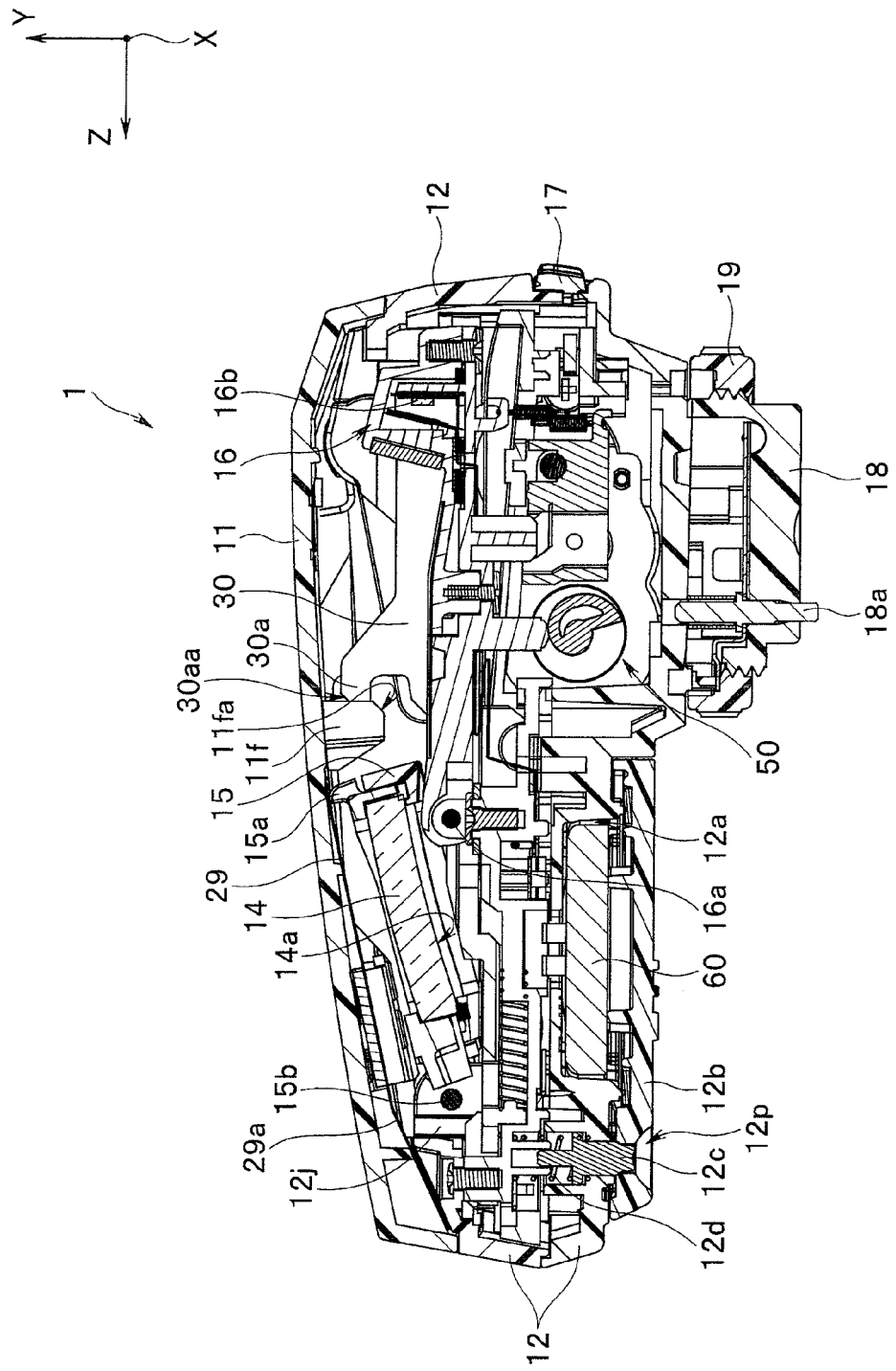
FIG. 5 is a sectional view taken along line [5]-[5] shown in [3B] of FIG. 3.
Figure 6:
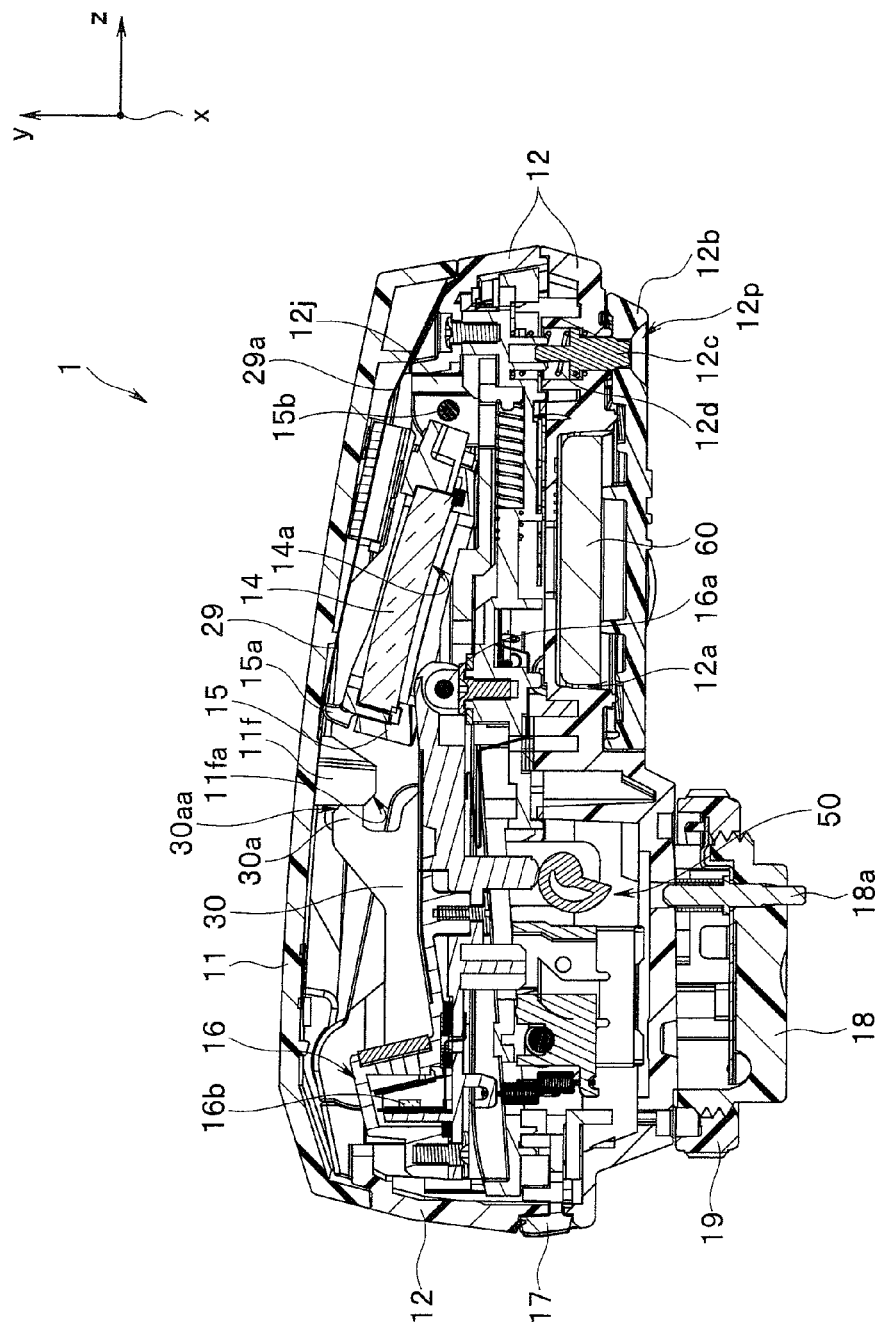
FIG. 6 is a sectional view taken along line [6]-[6] shown in [3B] of FIG. 3.
Figure 7:
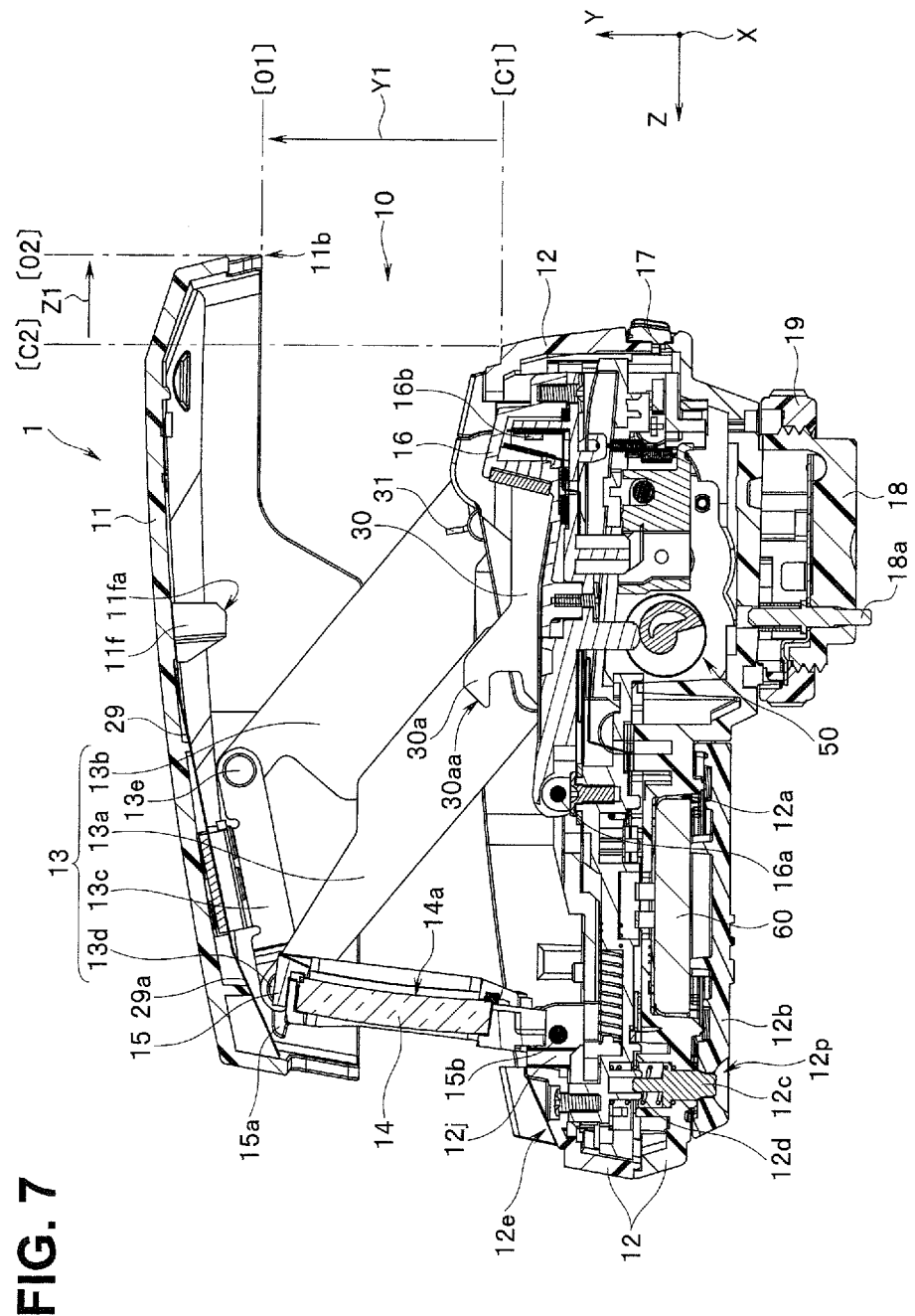
FIG. 7 is a sectional view taken along line [7]-[7] shown in [4B] of FIG. 4.
Figure 8:
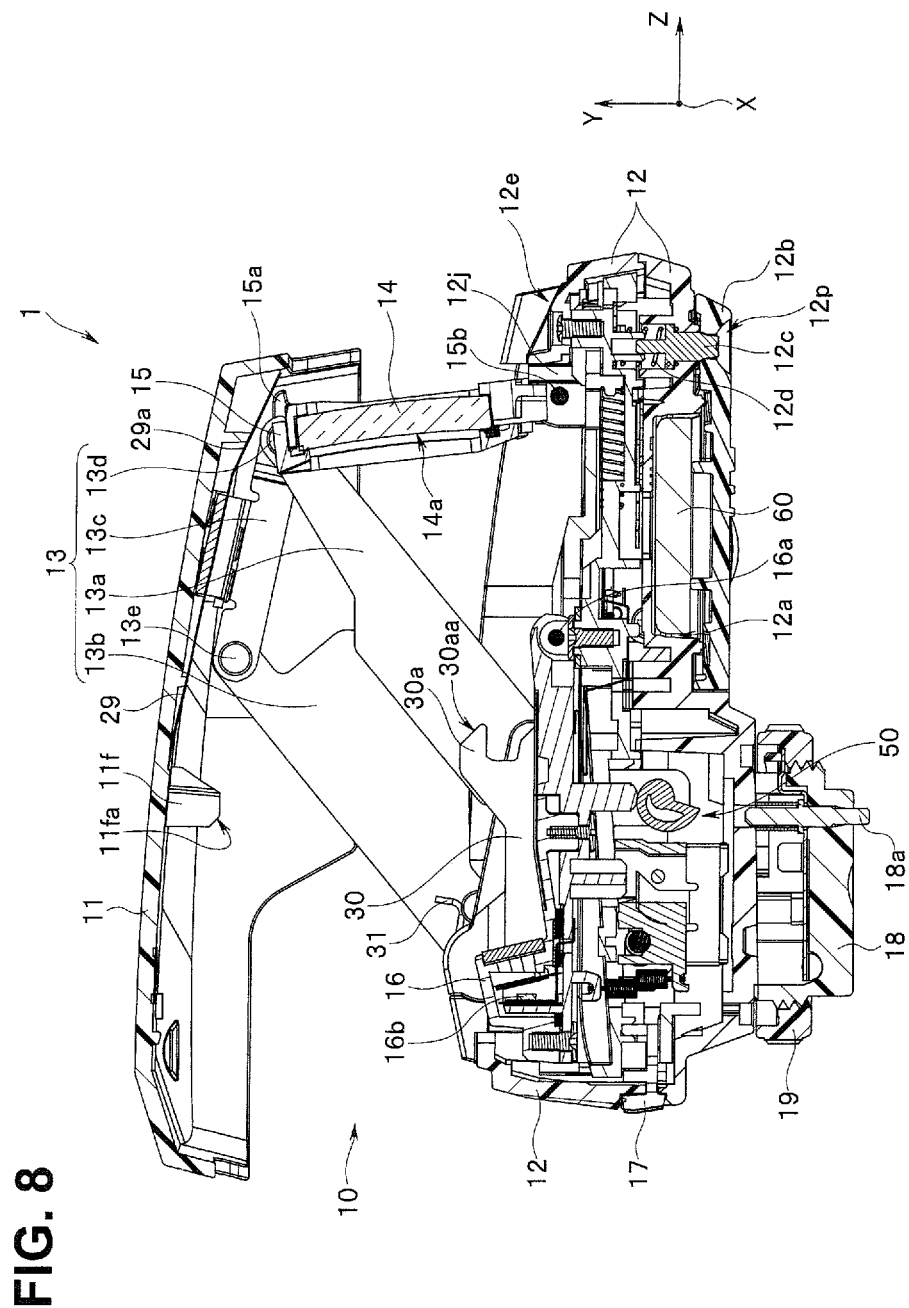
FIG. 8 is a sectional view taken along line [8]-[8] shown in [4B] of FIG. 4.
Figure 9:
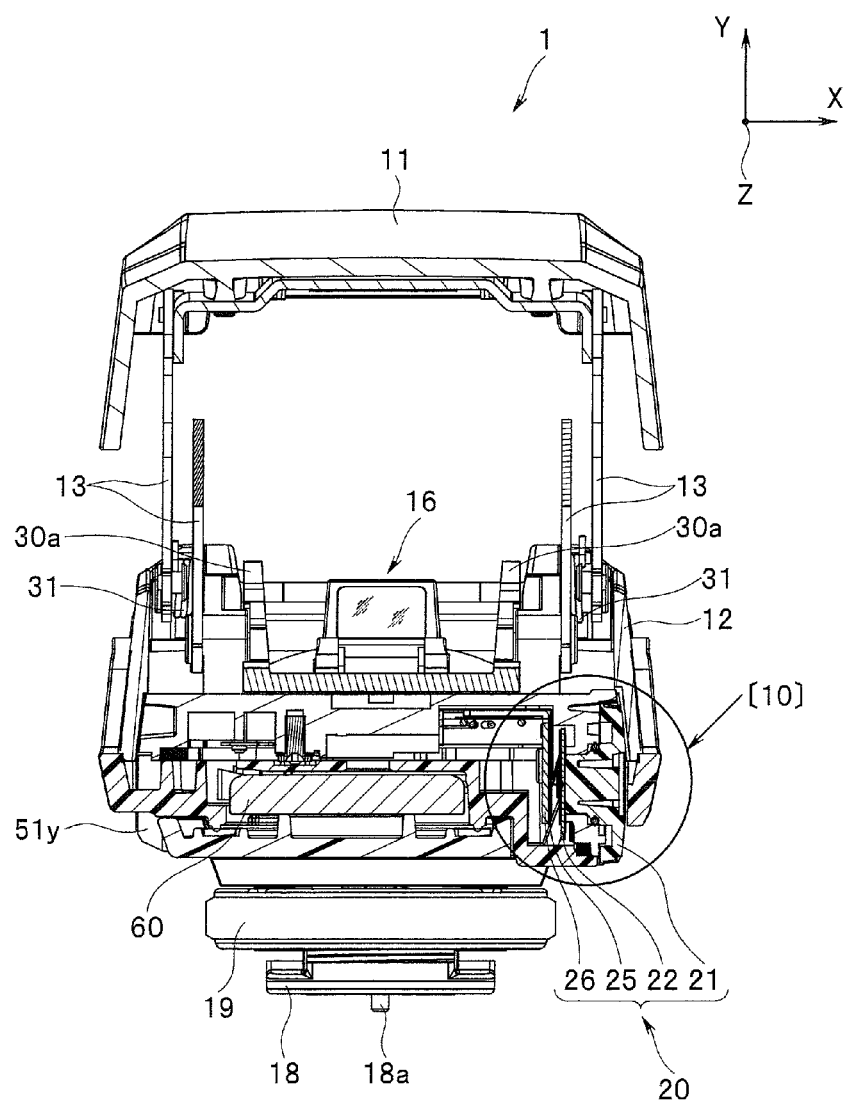
FIG. 9 is a sectional view taken along line [9]-[9] shown in [4D] of FIG. 4.
Figure 10:
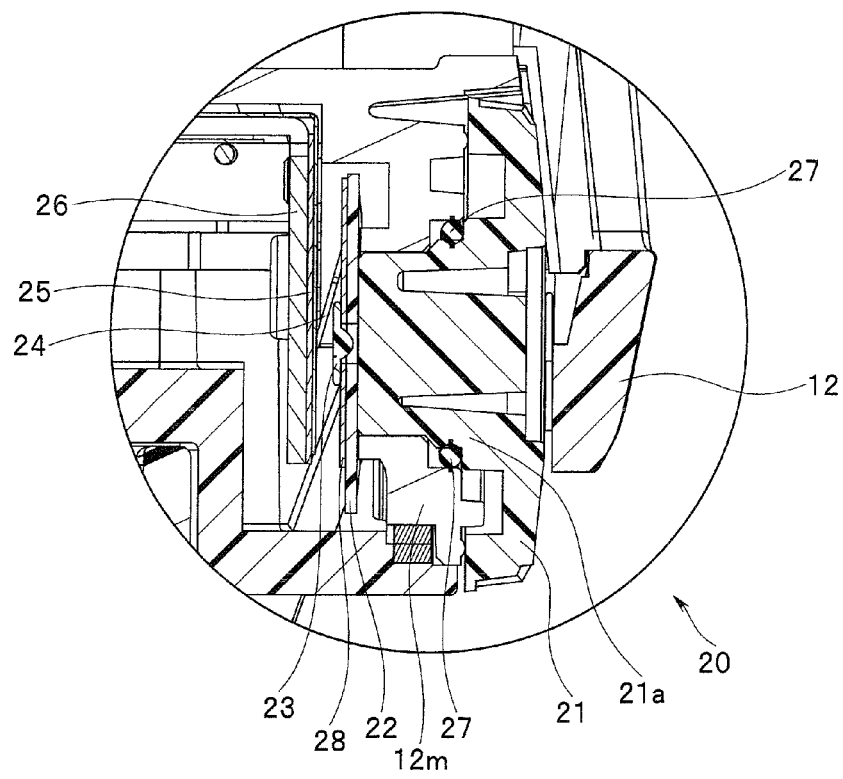
FIG. 10 is a main part enlarged sectional view of a region indicated by a sign [10] in FIG. 9.

FIGS. 5 to 9 are sectional view of the sighting device of the present embodiment. Among the figures, FIG. 5 is a sectional view taken along line [5]-[5] indicated by the sign [3B] in FIG. 3. FIG. 6 is a sectional view taken along line [6]-[6] indicated by the sign [3B] in FIG. 3. FIG. 7 is a sectional view taken along line [7]-[7] indicated by the sign [4B] in FIG. 4. FIG. 8 is a sectional view take along line [8]-[8] indicated by the sign [4B] in FIG. 4. FIG. 9 is a sectional view taken along line [9]-[9] indicated by the sign [4D] in FIG. 4. Note that FIG. 10 is a main part enlarged sectional view of a region indicated by a sign [10] in FIG. 9.

Figure 11:
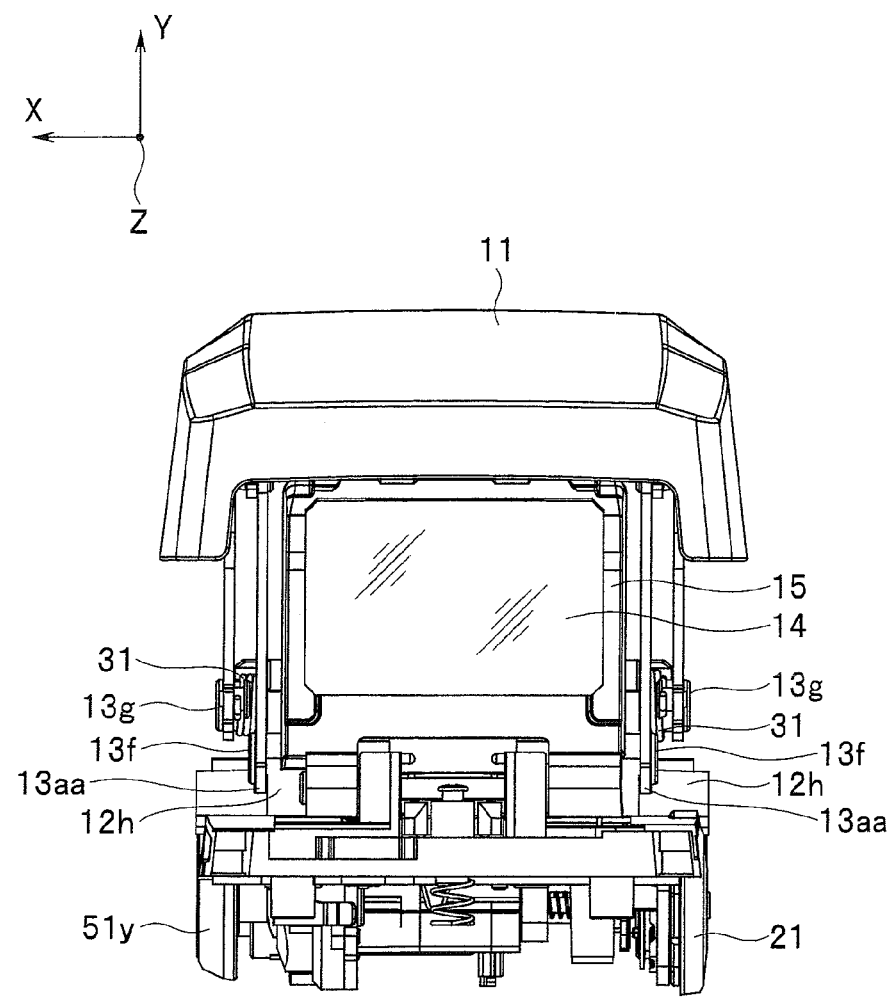
FIG. 11 is a front view showing an internal structure with a part of components removed in the form (the cover open state) during use of the sighting device of the embodiment of the present invention.
Figure 12:
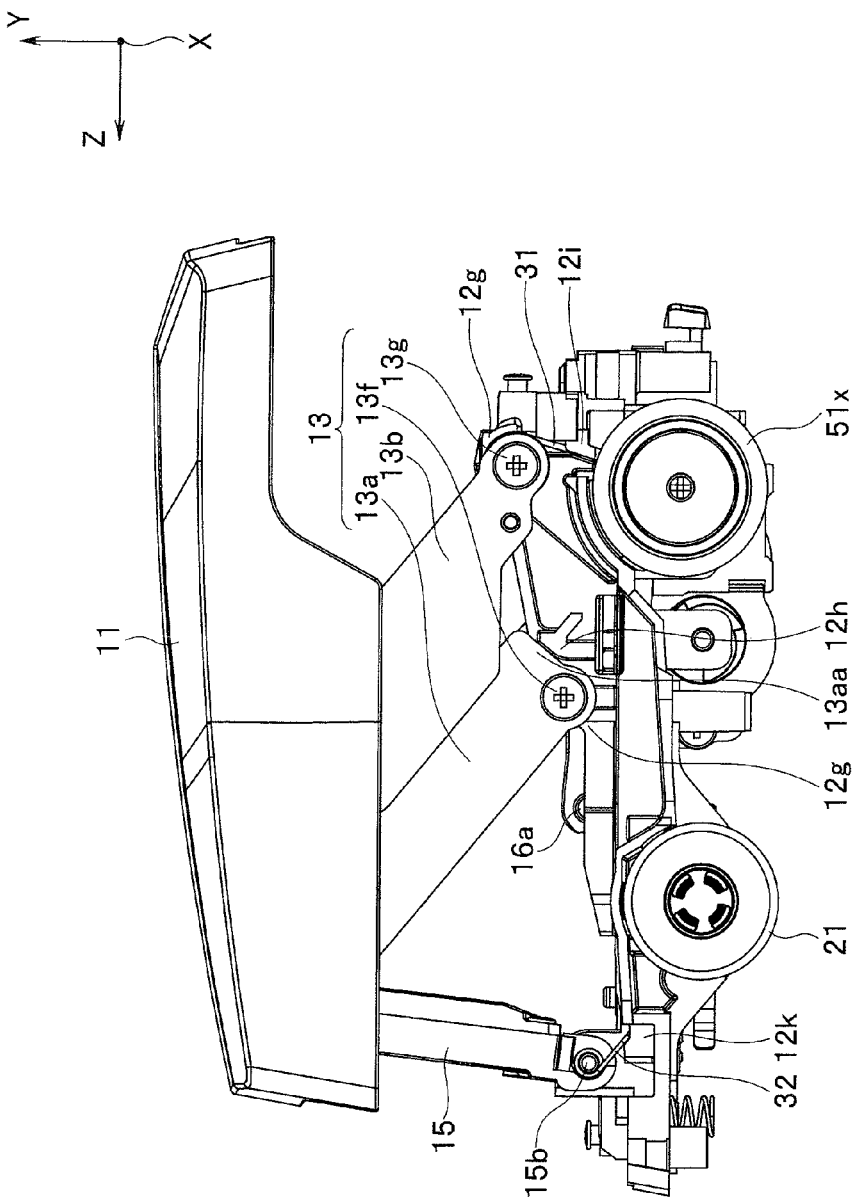
FIG. 12 is a right side view of FIG. 11.
Figure 13:
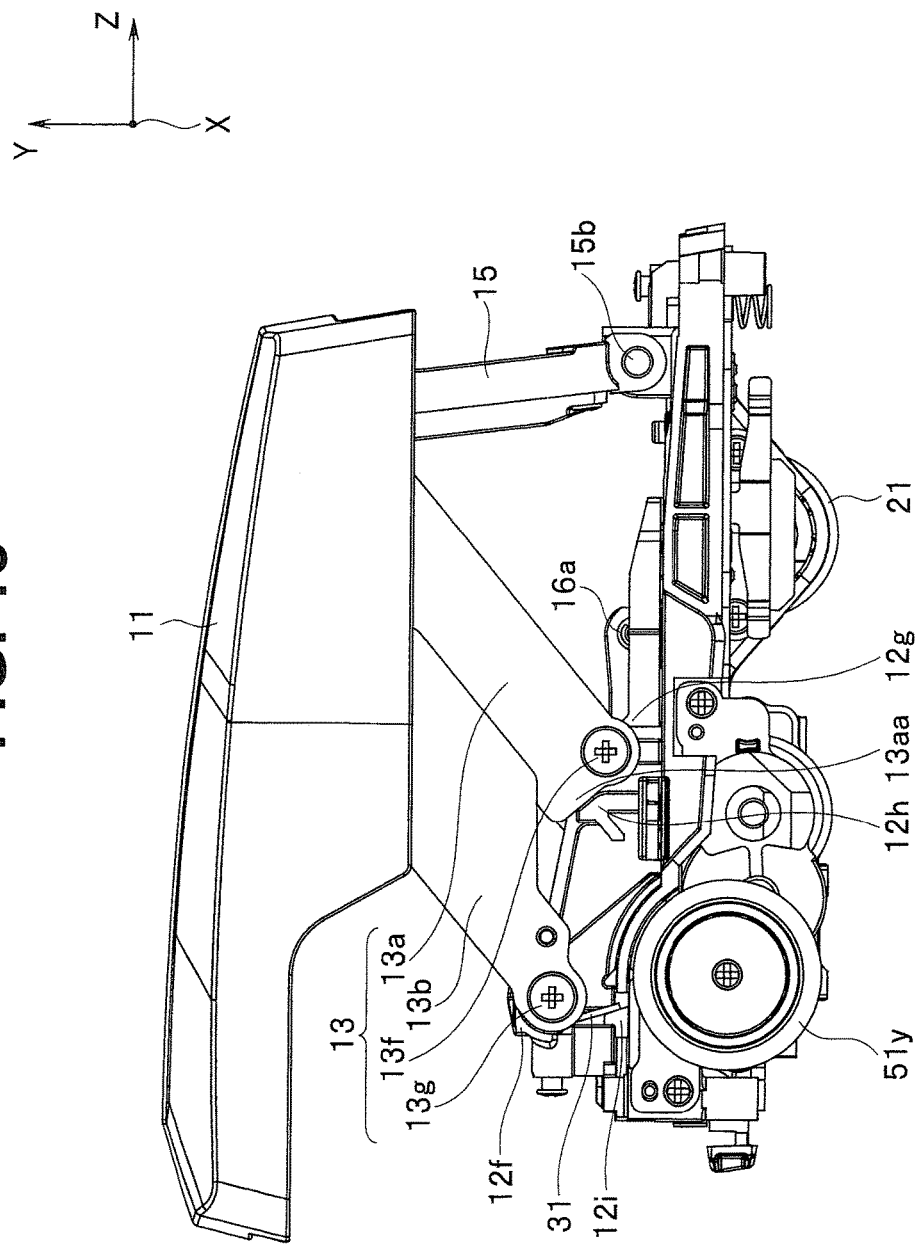
FIG. 13 is a left side view of FIG. 11.

FIGS. 11 to 13 are diagrams showing a state in which a part of components such as a main-body housing section is removed in the form (the cover open state) during use of the sighting device of the present embodiment in order to show an internal structure of the sighting device. Among the figures, FIG. 11 is a front view, FIG. 12 is a right side view, and FIG. 13 is a left side view.

Figure 14:
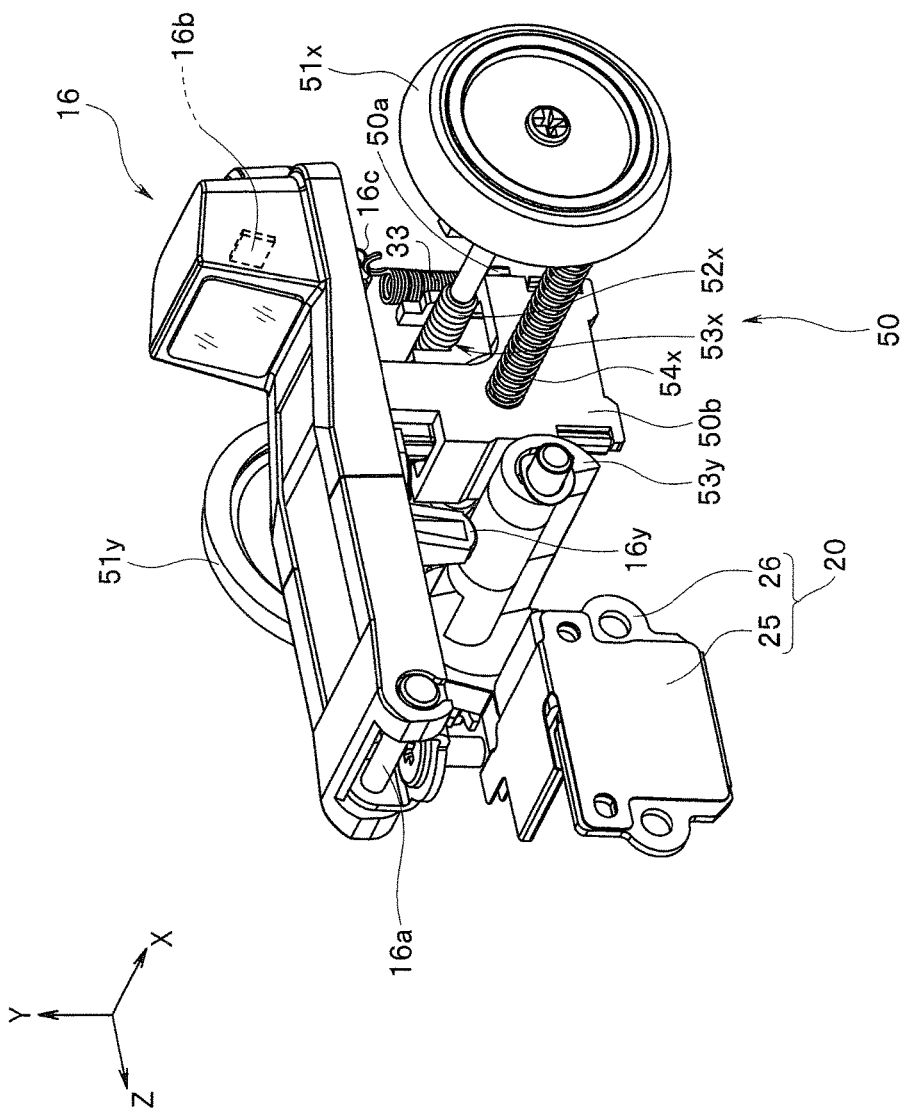
FIG. 14 is a perspective view mainly showing a right side surface of only an aiming light source and an aiming-light-source adjusting mechanism of the aiming light source extracted from an internal structure in the sighting device of the embodiment of the present invention.
Figure 15:
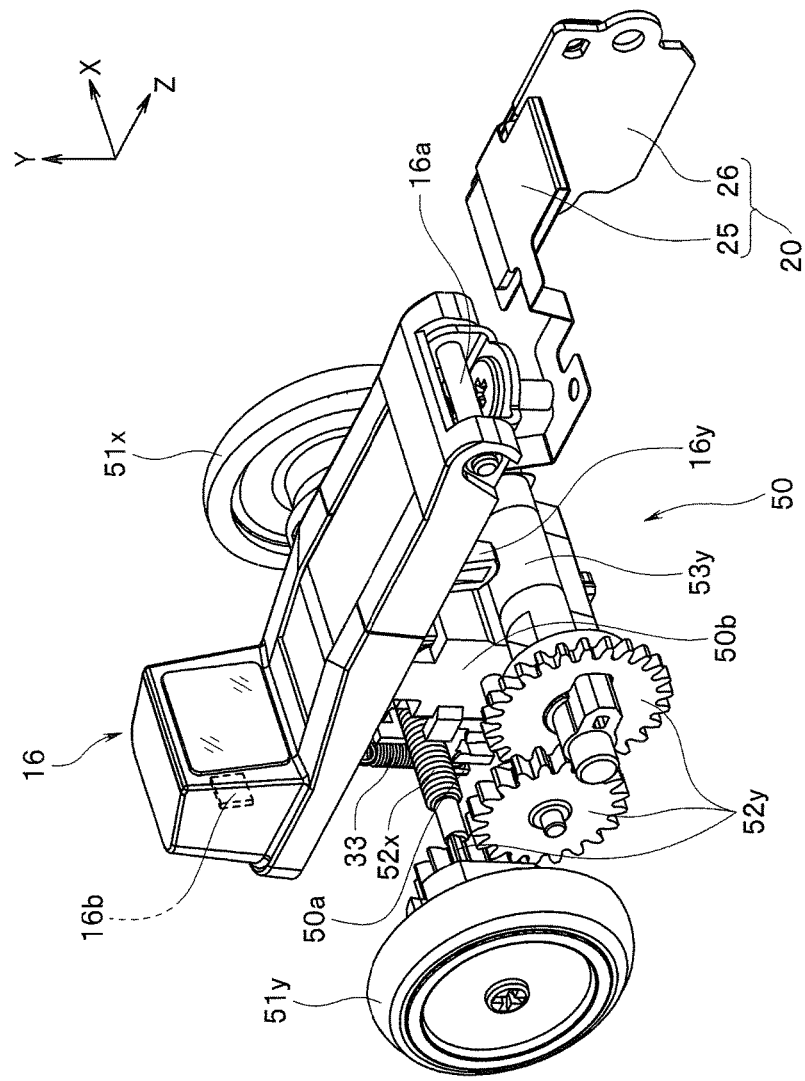
FIG. 15 is a perspective view mainly showing a left side surface of the aiming light source and the aiming-light-source adjusting mechanism of the aiming light source in the sighting device of the embodiment of the present invention.
Figure 16:
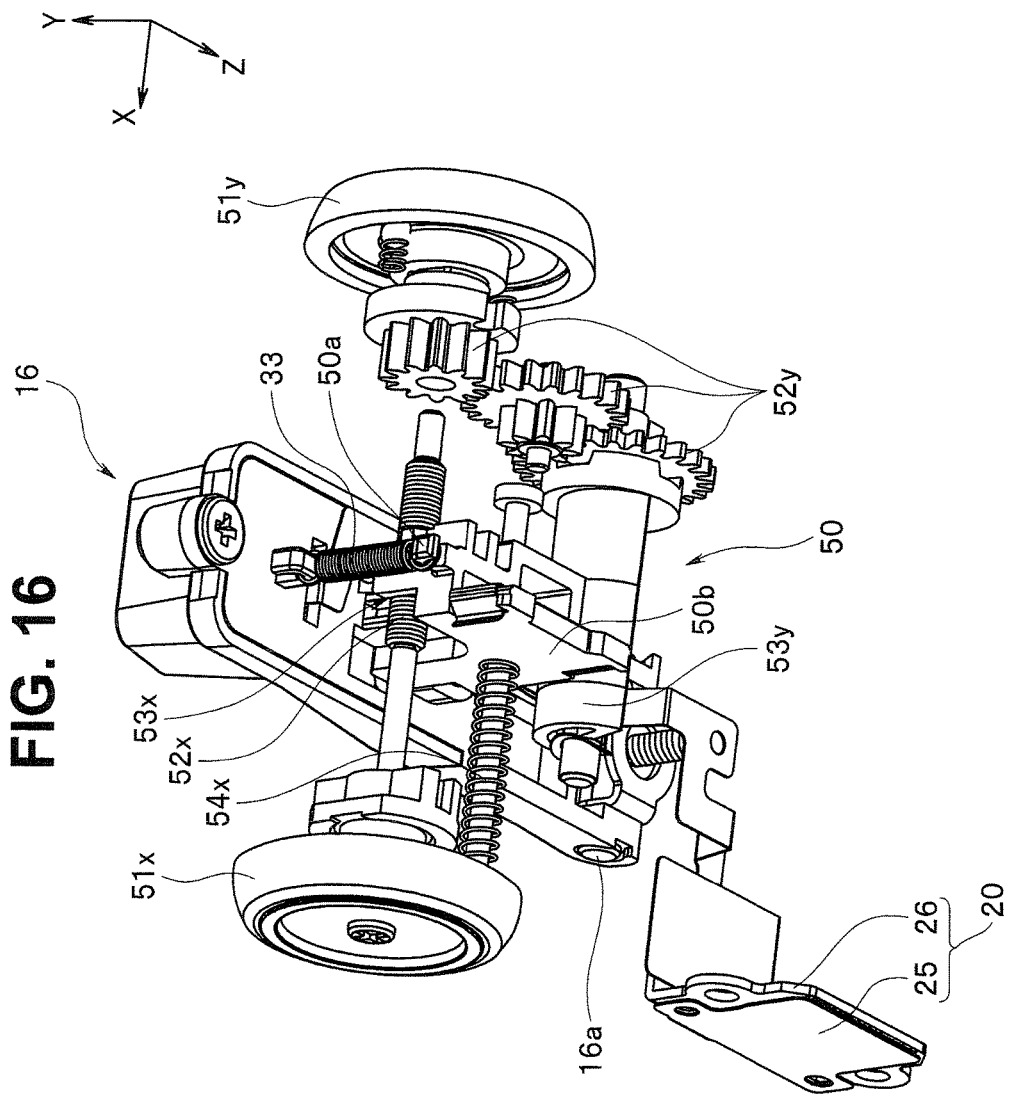
FIG. 16 is a perspective view mainly showing a bottom surface side of the aiming light source and the aiming-light-source adjusting mechanism of the aiming light source in the sighting device of the embodiment of the present invention.
Figure 17:
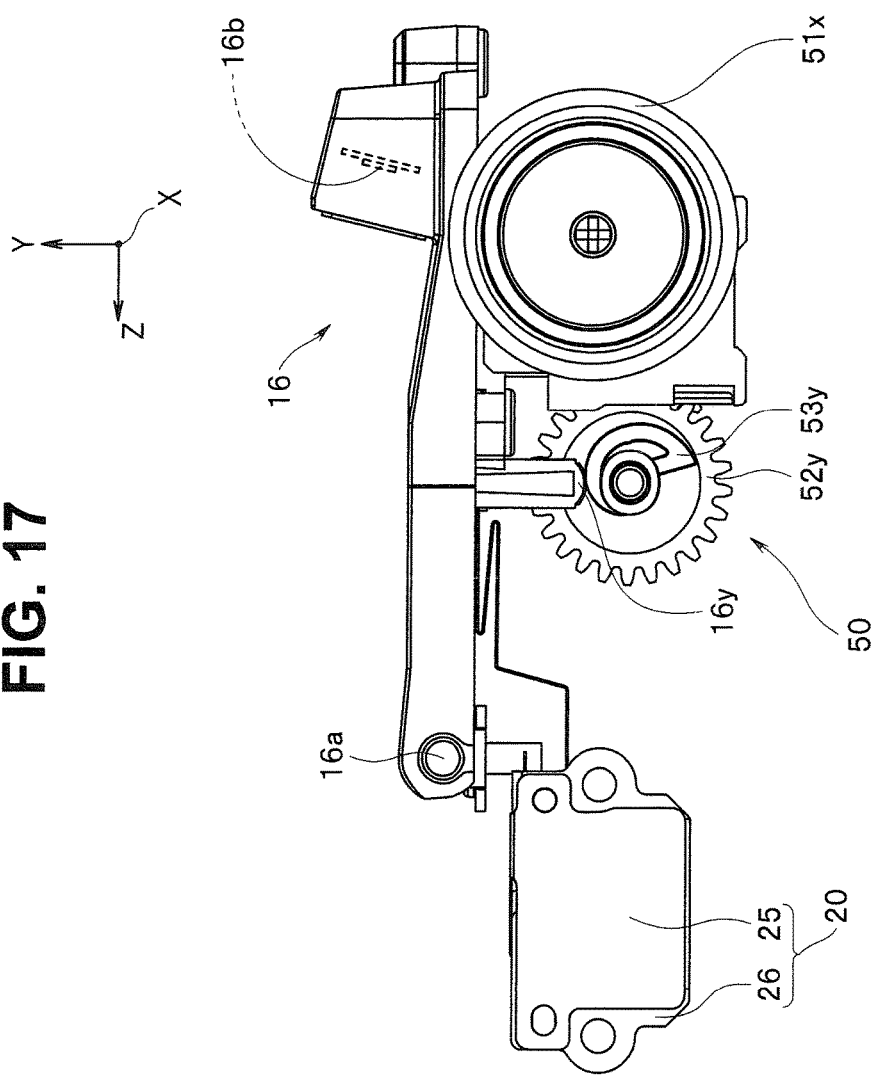
FIG. 17 is a right side view showing only the aiming light source and the aiming-light-source adjusting mechanism of the aiming light source extracted from the internal structure in the sighting device of the embodiment of the present invention.
Figure 18:
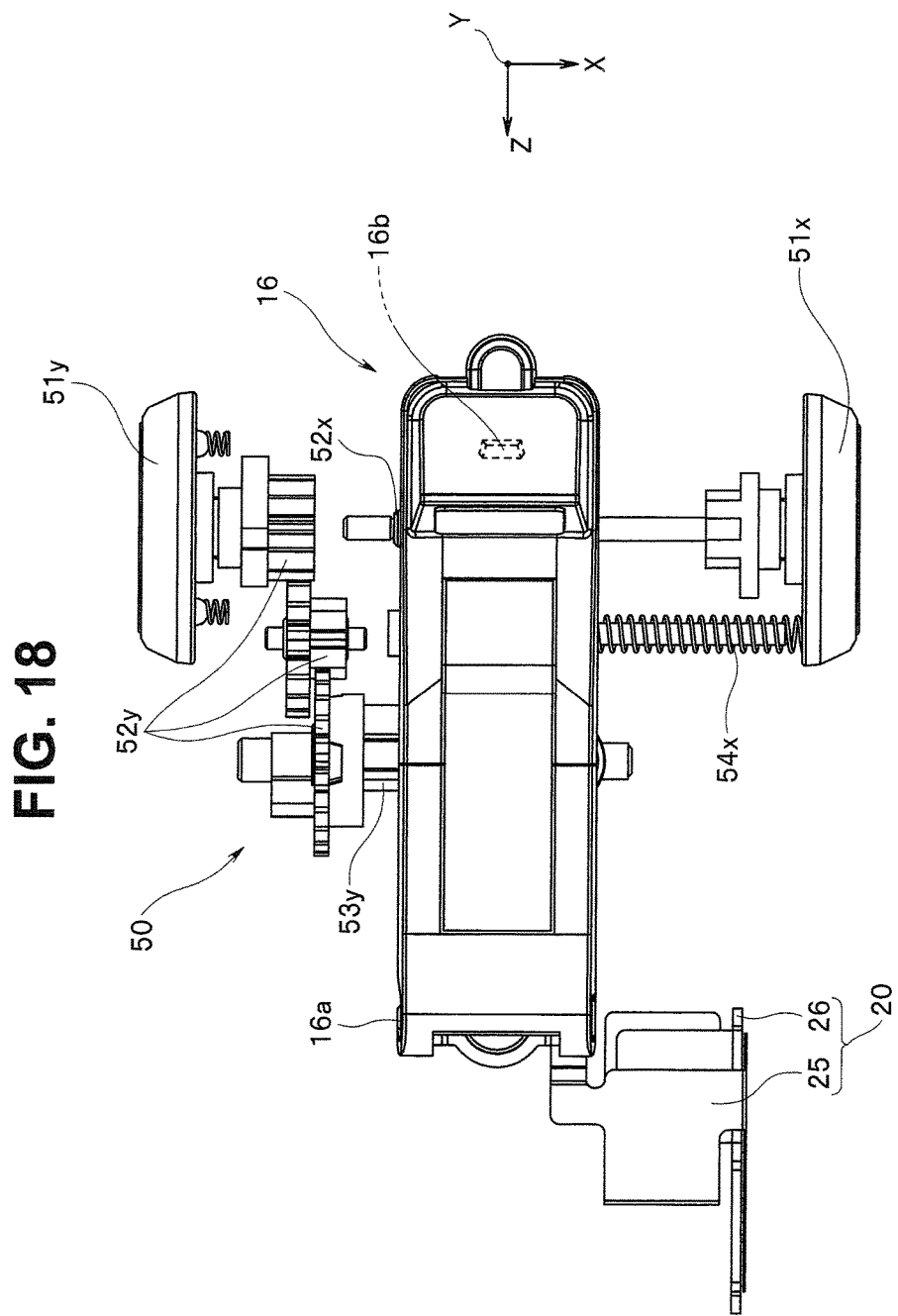
FIG. 18 is a top view of FIG. 17.
Figure 19:
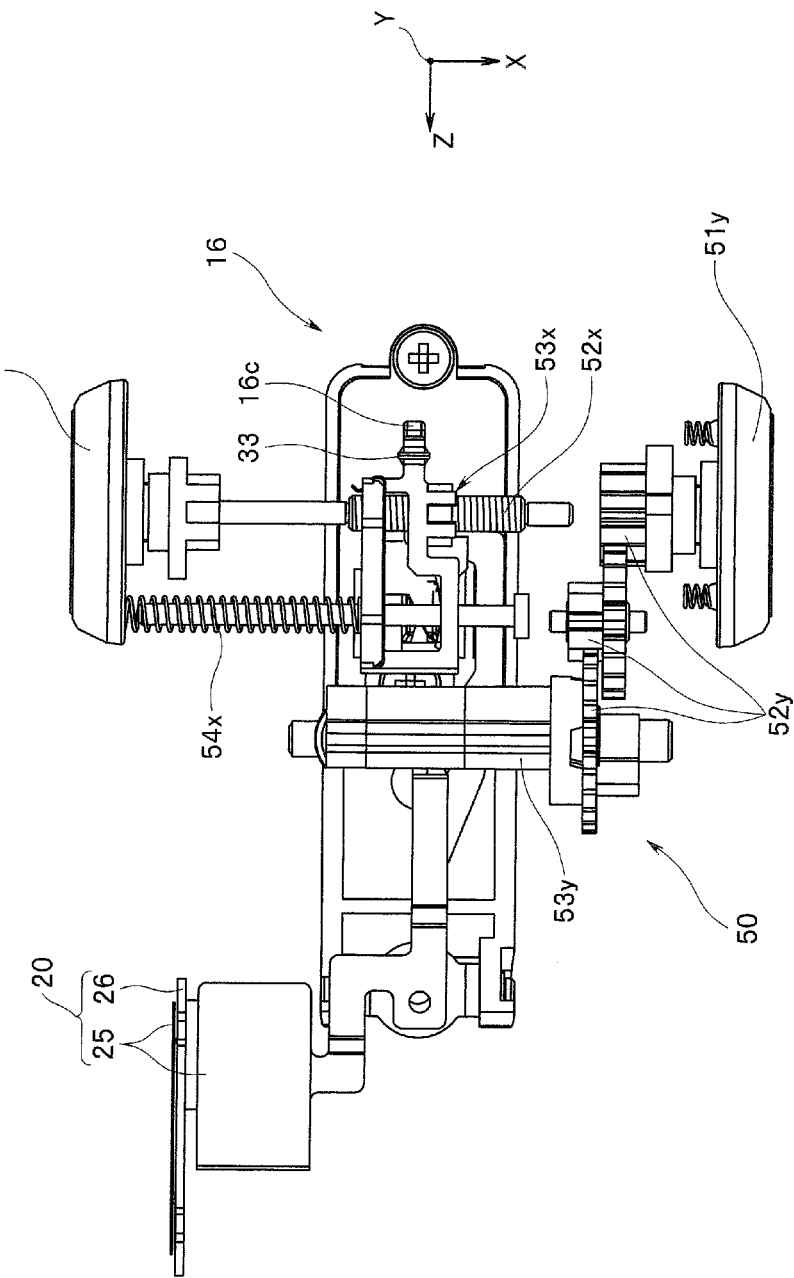
FIG. 19 is a bottom view of FIG. 17.

FIGS. 14 to 19 are diagrams showing only an aiming light source and an aiming-light-source adjusting mechanism of the aiming light source extracted from an internal structure in the sighting device of the present embodiment. Among the figures, FIGS. 14 to 16 are perspective views and FIGS. 17 and 18 are plan views. More specifically, FIG. 14 is a perspective view mainly showing a right side surface of the aiming light source and the aiming-light-source adjusting mechanism of the aiming light source in the sighting device. FIG. 15 is a perspective view mainly showing a left side surface of the aiming light source and the aiming-light-source adjusting mechanism of the aiming light source in the sighting device. FIG. 16 is a perspective view mainly showing a bottom surface side of the aiming light source and the aiming-light-source adjusting mechanism of the aiming light source in the sighting device. FIG. 17 is a right side view showing the aiming light source and the aiming-light-source adjusting mechanism of the aiming light source in the sighting device. FIG. 18 is a top view of the aiming light source and the aiming-light-source adjusting mechanism of the aiming light source in the sighting device. FIG. 19 is a bottom view of the aiming light source and the aiming-light-source adjusting mechanism of the aiming light source in the sighting device.

Figure 20:
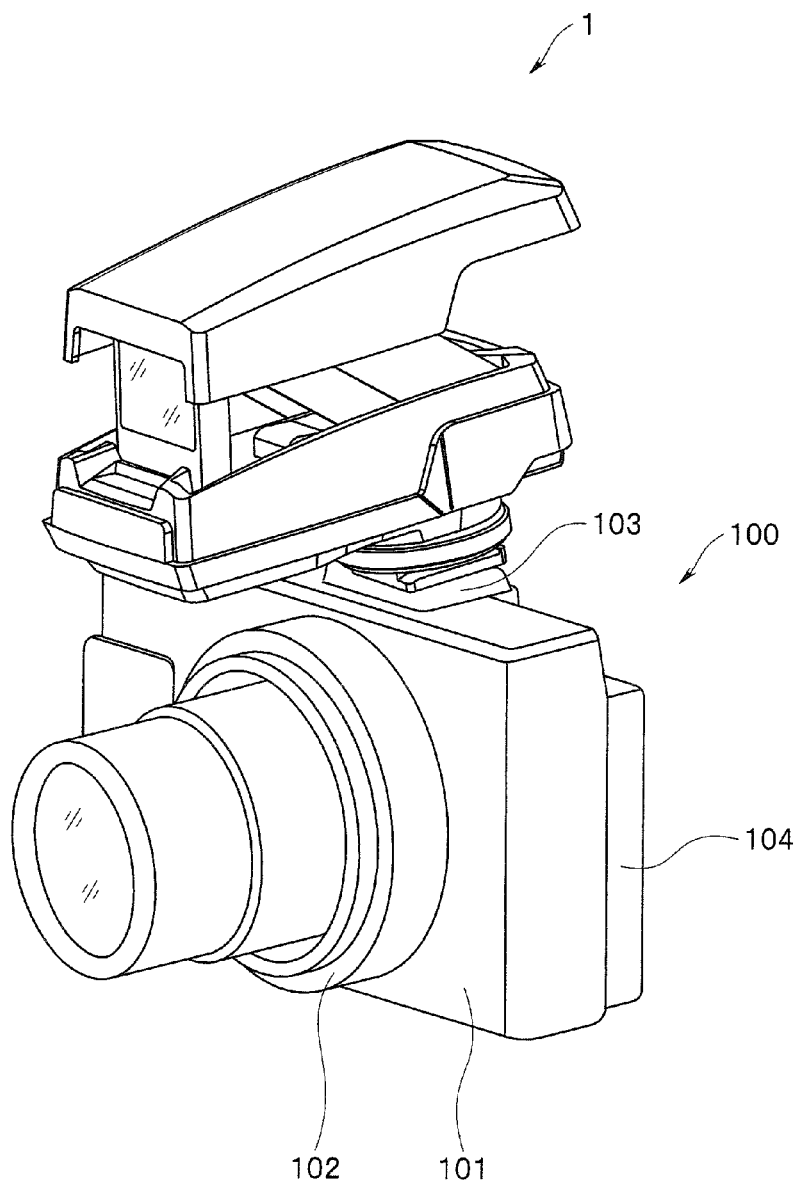
FIG. 20 is a conceptual diagram showing a state in which the sighting device of the embodiment of the present invention is attached to an apparatus in use (an image pickup apparatus) and used.

FIG. 20 is a conceptual diagram showing a state in which the sighting device of the present embodiment is attached to an image pickup apparatus, which is an apparatus in use, and used.

[Overall Configuration]

First, a schematic configuration of the sighting device of the present embodiment is explained below mainly with reference to FIGS. 1 to 4. A sighting device 1 of the present embodiment is an external apparatus for, when an image pickup target object (an object) present at a far distance is enlarged and subjected to image pickup or observed using, for example, an image pickup apparatus (not shown in the figure) such as a camera (including a digital camera and a digital video camera) or various optical apparatuses for observation such as a telescope (including a field scope, a spotting scope, and binoculars), by being directly mounted on the respective apparatuses in use or fixed in vicinities of the respective apparatuses in use using a fixture (not shown in the figure), assisting in introducing a desired target object into an image pickup visual field or an observation visual field of an apparatus in use (e.g., an image pickup apparatus; not shown in the figure: hereinafter simply referred to as apparatus in use) to which the sighting device 1 is attached to be used. The sighting device 1 illustrated in the present embodiment has a form generally referred to as "dot sight" or the like. Note that, in the following explanation, it is assumed that the sighting device 1 is mounted on an image pickup apparatus (not shown in the figure) such as a camera and used.

The sighting device 1 of the present embodiment includes an armor member including an upper cover member 11 and a main-body housing section 12, a parallel link mechanism 13, various constituent units (details are explained below) disposed on an inside of the main-body housing section 12, connecting mechanisms (18, 19) for mounting the sighting device 1 on an attachment section (e.g., an accessory shoe; not shown in the figure) of the apparatus in use, and the like.

Both of the upper cover member 11 and the main-body housing section 12 configuring the armor member are housings having openings in one surface. The upper cover member 11 and the main-body housing section 12 are fit to cover openings (11x, 12x) thereof each other to be integrated. Consequently, one housing having a predetermined space on an inside is formed.

The upper cover member 11 and the main-body housing section 12 are coupled by the parallel link mechanism 13. The parallel link mechanism 13 is a member that couples the upper cover member 11 and the main-body housing section 12 to enable the respective openings 11x and 12x to open and close. The parallel link mechanism 13 translates the upper cover member 11 within a predetermined range (between a closed position and an open position explained below) with respect to the main-body housing section 12. Note that a detailed configuration of the parallel link mechanism 13 is explained below.

Therefore, the sighting device 1 of the present embodiment is configured to be capable of being displaced to two forms, i.e., the form (the cover closed state) during nonuse shown in FIG. 1 and Fig. 3 and the form (the cover open state) during use shown in FIG. 2 and FIG. 4 when the parallel link mechanism 13 acts.

The form during nonuse shown in FIG. 1 and FIG. 3 is a state in which the upper cover member 11 covers the entire opening 12x on an upper surface side of the main-body housing section 12. In this state, various constituent units housed on the inside of the main-body housing section 12 are covered by the upper cover member 11. Note that a position of the upper cover member 11 at this point is referred to as closed position and the state is referred to as cover closed state. In this state, the upper cover member 11 and the main-body housing section 12 are substantially integrated. The upper cover member 11 and the main-body housing section 12 configure one housing having a predetermined space on an inside. At this point, the parallel link mechanism 13 is housed inside the space of the housing in a reclined state.

On the other hand, the form during use shown in FIG. 2 and FIG. 4 is a state in which the upper cover member 11 is disposed, via the parallel link mechanism 13, in a position separated from the opening 12x on the upper surface side of the main-body housing section 12. In this state, the upper cover member 11 covers the upper surface side of the main-body housing section 12. At the same time, the upper cover member 11 forms, between the upper cover member 11 and the main-body housing section 12, an optical path opening 10 (details are explained below; see FIGS. 7 and 8) extending along an optical path of aiming light emitted from an aiming light source unit 16 (details are explained below) among the constituent units housed on the inside of the main-body housing section 12. A position of the upper cover member 11 at this point is referred to as open position and the state is referred to as cover open state. In this state, the upper cover member 11 and the main-body housing section 12 are coupled via the parallel link mechanism 13 that is in a standing state. The upper cover member 11 is disposed in a position separated from the main-body housing section 12. Note that mechanisms for respectively keeping the closed position and the open position of the upper cover member 11 are provided. Details of the mechanisms are explained below.

As explained above, the upper cover member 11 is a cover member formed by, for example, resin molding as the housing having the opening 11x in one surface. The upper cover member 11 is formed by a top surface section 11a forming a closing section of a position opposed to the opening 11x and functioning as a surface for mainly covering the upper surface side of the main-body housing section 12 and a plurality of wall surfaces standing from a peripheral edge of the top surface section 11a to surround the opening 11x, that is, a right sidewall 11b, a left sidewall 11c, a front surface wall 11d, and a rear surface wall 11e.

Among the plurality of wall surfaces, the right sidewall 11b and the left sidewall 11c are surfaces that mainly cover left and right side surfaces of the main-body housing section 12. The right sidewall 11b and the left sidewall 11c have a form in which a region 11bb close to a rear surface along a Z axis is cut out with respect to the other region 11ba. Consequently, the upper cover member 11 is formed such that, when the upper cover member 11 is in the open position, opening visual fields on both side directions close to the rear surface are secured in a direction along the optical path opening 10.

The front surface wall 11d is a surface that mainly covers a front surface side of the main-body housing section 12. In the front surface wall 11d, a cutout 11da is formed by cutting out a part of the front surface wall 11d in order to secure, when the upper cover member 11 is in the open position, an opening visual field an upper part of in a front surface side in the direction along the optical path opening 10. The rear surface wall 11e is a surface that mainly covers a rear surface of the main-body housing section 12. In the rear surface wall 11e, as in the front surface wall 11d, a cutout 11ea is formed by cutting out a part of the rear surface wall 11e in order to secure, when the upper cover member 11 is in the open position, an opening visual field in an upper part of a rear surface side in the direction along the optical path opening 10.

As explained above, the main-body housing section 12 is formed by, for example, resin molding as the housing having the opening 12x in one surface. The main-body housing section 12 is formed by a bottom surface section forming a closing section of a position opposed to the opening 12x and functioning as a surface that mainly covers a bottom surface side of the main-body housing section 12 and a plurality of wall surfaces (left and right sidewalls, a front surface wall, and a rear surface wall) standing from a peripheral edge of the bottom surface section to surround the opening 12x.

Note that, in a state in which the upper cover member 11 is disposed in the closed position with respect to the main-body housing section 12, the opening 11x of the upper cover member 11 is disposed to be opposed to the opening 12x of the main-body housing section 12. The upper cover member 11 completely covers the opening 12x of the main-body housing section 12. An outer surface of the upper cover member 11 and an outer surface of the main-body housing section 12 are configured to be substantially flush with each other as a whole at this point.

In a state in which the upper cover member 11 is disposed in the open position with respect to the main-body housing section 12, as explained above, the upper cover member 11 covers the upper surface side of the opening 12x in a position separated from the opening 12x. At this point, the optical path opening 10 extending along the optical path of the aiming light emitted from the aiming light source unit 16 is formed between the upper cover member 11 and the main-body housing section 12. In this case, on the front surface wall of the main-body housing section 12, a front surface cutout 12e is formed by cutting out a part of the front surface wall in order to secure opening visual fields in a front surface side downward direction and both side directions thereof in the direction along the optical path opening 10. The front surface wall has thickness and is opened having the front surface cutout 12e and an inclined surface becoming wider toward the front surface downward direction and the front surface both side directions.

The various constituent units are housed and disposed on the inside of the main-body housing section 12. For example, an optical element 14 and an optical-element holding frame 15, an aiming light source unit 16, an aiming-light-source adjusting mechanism 50, a power supply section, an illuminance adjusting section 20, and the like are housed and disposed.

The aiming light source unit 16 is a constituent unit including, for example, an aiming light source 16b that emits aiming light. The optical element 14 and the optical-element holding frame 15 are constituent sections including a reflection surface 14a that reflects the aiming light from the aiming light source unit 16 and indicating a visual field range set as an image pickup or observation target. Detailed configurations of the optical element 14 and the optical-element holding frame 15 and the aiming light source unit 16 are explained below.

The aiming-light-source adjusting mechanism 50 is a constituent unit for performing adjustment of an emitting direction of the aiming light emitted from the aiming light source unit 16. That is, the aiming-light-source adjusting mechanism 50 adjusts positions in an X-axis direction and a Y-axis direction on the reflection surface of the optical element 14 of a light point of the aiming light. A detailed configuration of the aiming-light-source adjusting mechanism 50 is explained below.

The power supply section is configured by an electric circuit or the like that includes a power supply battery 60 and supplies electric power of the power supply battery 60 to the aiming light source unit 16.

The illuminance adjusting section 20 is a light-amount adjusting mechanism for adjusting an emitted light amount of the aiming light emitted from the aiming light source unit 16. Note that the illuminance adjusting section 20 also functions as a switching mechanism that performs switching of ON and OFF of the aiming light from the aiming light source unit 16. A detailed configuration of the illuminance adjusting section 20 is explained below.

A plurality of operation members are disposed on an outer surface side of the main-body housing section 12. The plurality of operation members are associated with the respective constituent units housed on the inside of the main-body housing section 12. For example, in a part close to a front surface on a right side surface (the right sidewall 11b) of the main-body housing section 12, a power-supply-ON/OFF and illuminance adjustment dial 21 included in the illuminance adjusting section 20 is disposed turnably around an X axis. In a part close to a rear surface on the right side surface (the right sidewall 11b) of the main-body housing section 12, an X-axis-direction adjustment dial 51x included in the aiming-light-source adjusting mechanism 50 is disposed turnably around the X-axis. In a part close to the rear surface on a left side surface (the left sidewall 11c) of the main-body housing section 12, that is, a part opposed to the X-axis-direction adjustment dial 51x, a Y-axis-direction adjustment dial 51y included in the aiming-light-source adjusting mechanism 50 is disposed turnably around the X-axis. Further, in a substantially center part on the rear surface wall of the main-body housing section 12, an upper-cover opening lever 17, which is an operation member for releasing a lock state of the closed position of the upper cover member 11, is disposed slidably in a direction along the X axis. Note that a detailed configuration of a closed-position-lock releasing mechanism including the upper-cover opening lever 17 is explained below.

On the bottom surface side of the main-body housing section 12, a connecting mechanism for connecting and fixing the sighting device 1 to an attachment section (an accessory shoe, etc.; not shown in the figure) of the apparatus in use in which the sighting device 1 is used is disposed. The connecting mechanism is configured by a connecting and fitting section 18 for connecting and fixing the sighting device 1 to the accessory shoe (not shown in the figure) of the apparatus in use, a fastening ring 19 for fixing the connecting and fitting section 18 to the accessory shoe (not shown in the figure) of the apparatus in use, a contact 18a for securing electrical connection of the sighting device 1 and the apparatus in use, and the like. Note that, as the connecting mechanism, a general-purpose mechanism corresponding to an accessory shoe of an image pickup apparatus or the like spread to public in the past is applied. Therefore, a detailed configuration of the connecting mechanism is omitted.

On the inside of the main-body housing section 12, a battery housing chamber 12a explained below (not shown in FIGS. 1 to 4; see FIG. 5, etc.) is formed in a predetermined region on the bottom surface side. In order to insert and remove the power supply battery 60 housed in the battery housing chamber 12a, a region of a bottom surface section of the main-body housing section 12 is detachably formed as a battery lid 12b. Therefore, a battery-lid opening and closing mechanism for removing the battery lid 12b is disposed on the inside of the main-body housing section 12. Note that a detailed configuration of the battery-lid opening and closing mechanism is explained below.

[Respective Section's Detailed Configuration: Closed-Position-Lock Releasing Mechanism/Closed-Position Locking Mechanism]

Detailed configurations of the respective sections in the sighting device 1 of the present embodiment are sequentially explained below. First, detailed configurations of a closing-position-lock releasing mechanism for releasing a closed position lock state of the upper cover member 11 and a closed-position locking mechanism for maintaining the closed position lock state when the upper cover member 11 is present in the closed position are explained below mainly with reference to FIGS. 5 to 8.

The closed-position-lock releasing mechanism and the closed-position locking mechanism of the upper cover member 11 are mainly configured by the upper-cover opening lever 17 and an upper-cover locking member 30.

As explained above, the upper-cover opening lever 17 is disposed in the substantially center part of the rear surface wall of the main-body housing section 12 slidably in the direction along the X axis. In this case, the upper-cover opening lever 17 is disposed in the main-body housing section 12 in a form in which a part of the upper-cover opening lever 17 is exposed to an outside such that a user can slide the upper-cover opening lever 17 using a finger or the like.

Another part of the upper-cover opening lever 17 is disposed to pierce through the inside via the rear surface wall of the main-body housing section 12. The other part is always urged toward one direction along the X axis by a not-shown urging member or the like on the inside of the main-body housing section 12. The other part is configured to act on the upper-cover locking member 30 when the upper-cover opening lever 17 is slid.

As explained above, the upper-cover locking member 30 is a member disposed on the inside of the main-body housing section 12 to move in one predetermined direction by acting according to the sliding of the upper-cover opening lever 17. The upper-cover locking member 30 is always urged toward a direction along the Z axis, that is, the front surface side by a not-shown urging member or the like on the inside of the main-body housing section 12.

As shown in FIG. 5 and the like, the upper-cover locking member 30 includes a locking claw section 30a, a distal end of which is formed in a hook shape. When the upper cover member 11 is changed to the closed position, the locking claw section 30a maintains the closed position of the upper cover member 11 by locking a locked section 11f formed on an inner surface of the upper cover member 11.

When the upper cover member 11 is in the closed position, when the user slides the upper-cover opening lever 17 in the other direction along the X axis resisting an urging force of the urging member (not shown in the figure), the upper-cover locking member 30 moves toward the rear surface wall along the Z axis resisting the urging force of the urging member (not shown in the figure) in association with the sliding of the upper-cover opening lever 17. A locked state of the locking claw section 30*a* of the upper-cover locking member 30 and the locked section 11*f* of the upper cover member 11 is released. As explained below, the upper cover member 11 is urged toward a substantially upward direction along the Y axis by an urging force of an urging member (a torsion spring 31) included in the parallel link mechanism 13. Therefore, when the locking state of the locking claw section 30*a* and the locked section 11*f* is released as explained above, the upper cover member 11 moves from the closed position to the open position. The sighting device 1 changes to a use state shown in FIGS. 7 and 8.

That is, the user can release the closed position lock state only by sliding the upper-cover opening lever 17 in the predetermined direction (the other direction along the X axis) and displace the sighting device 1 from a nonuse state to the use state.

When the upper cover member 11 is in the open position, to move the upper cover member 11 to the closed position and change the sighting device 1 to the nonuse state, the user directs the top surface section of the upper cover member 11 in a substantially downward direction along the Y axis from the upper surface side with a finger or the like and pushes down the upper cover member 11 resisting the urging force of the urging member (the torsion spring 31; explained below) of the parallel link mechanism 13. Then, the upper cover member 11 moves toward a predetermined closed position. The locked section 11*f* is locked by the locking claw section 30*a* soon.

An inclined surface 11*fa* inclined toward the rear surface side is formed in a distal end portion of the locked section 11*f* such that the locked section 11*f* is smoothly locked by the locking claw section 30*a* according to a descending motion of the upper cover member 11 in this case. An inclined surface 30*aa* inclined toward the front surface is formed in a distal end portion of the locking claw section 30*a* to correspond to the inclined surface 11*fa*. The inclined surface 11*fa* and the inclined surface 30*aa* are set to substantially equal inclination angles.

Therefore, the upper cover member 11 moves toward the predetermined closed position. The inclined surface 11*fa* at the distal end of the locked section 11*f* comes into contact with the inclined surface 30*aa* at the distal end of the locking claw section 30*a*. In this state, when the upper cover member 11 is pressed in a descending direction, the inclined surface 11*fa* of the locked section 11*f* comes into contact with the inclined surface 30*aa* of the locking claw section 30*a* and slides while pressing the upper-cover locking member 30 downward and to the rear surface side. Finally, the locking claw section 30*a* is locked to the locked section 11*f*. The nonuse state (the closed position) shown in FIGS. 5 and 6 is maintained.

In this way, the user can displace the upper cover member 11 from the open position to the closed position lock state only by pressing the upper cover member 11 in the predetermined direction (the substantially downward direction along the Y axis) and displace the sighting device 1 from the use state to the nonuse state.

[Respective Section's Detailed Configuration: Parallel Link Mechanism]

A detailed configuration of the parallel link mechanism 13 in the sighting device 1 is explained mainly with reference to FIGS. 7, 8, 11 to 13, and the like.

The parallel link mechanism 13 is a mechanism unit that couples the upper cover member 11 and the main-body housing section 12, enables the openings 11*x* and 12*x* to open and close, and translates the upper cover member 11 between the predetermined closed position and the open position with respect to the main-body housing section 12.

The parallel link mechanism 13 is configured by a plurality of link members formed in an elongated and wide flat shape, that is, a first link 13*a*, a second link 13*b*, a coupling link 13*c*, and the like. Note that, in the sighting device 1 of the present embodiment, the same parallel link mechanisms 13 are disposed on the respective left and right side surfaces. The first link 13*a* and the second link 13*b* are disposed between the upper cover member 11 and the main-body housing section 12 to be always parallel to each other.

In this case, the coupling links 13*c* are respectively fixed on respective inner surface sides of left and right sidewalls (11*b*, 11*c*) of the upper cover member 11. One ends of the first links 13*a* are turnably axially supported at one ends (sign 13*d*) close to a front of the coupling links 13*c*. Similarly, one ends of the second links 13*b* are turnably axially supported at the other ends (sign 13*e*) close to a rear of the coupling links 13*c* (see FIGS. 7 and 8).

As shown in FIGS. 7, 8, and the like, when the sighting device 1 is set in the use state and viewed from a side direction, the first link 13*a* and the second link 13*b* are disposed to partially overlap. This configuration is realized by disposing the first link 13*a* and the second link 13*b* as explained below. That is, in the present embodiment, the first link 13*a* is coupled to be disposed on an outer side surface of the coupling link 13*c* and the second link 13*b* is coupled to be disposed on an inner side surface of the coupling link 13*c*. That is, the first link 13*a* and the second link 13*b* are disposed to sandwich the coupling link 13*c*. With this configuration, the first link 13*a* and the second link 13*b* slide with respect to the coupling link 13*c* without interfering with each other. When the sighting device 1 is changed to the nonuse state, the three link members are housed in a state in which the link members are laid one on top of another in the order of the first link 13*a*, the coupling link 13*c*, and the second link 13*b* from the outside. With this configuration, when the sighting device 1 is changed to the use state, the first link 13*a* and the second link 13*b* overlap without gap formed therebetween. Therefore, it is possible to block external light from a side direction.

A portion where one end of the first link 13*a* and one end of the coupling link 13*c* are turnably axially supported is referred to as a first-link upper turning support shaft 13*d*. Similarly, a portion where one end of the second link 13*b* and the other end of the coupling link 13*c* are turnably axially supported is referred to as a second-link upper turning support shaft 13*e*.

On the other hand, a first-link lower turning support shaft 13*f*, which is the other end of the first link 13*a*, is turnably axially supported in a fixed part 12*g* substantially in the middle on the inside of the main-body housing section 12. Similarly, a second-link lower turning support shaft 13*g*, which is the other end of the second link 13*b*, is turnably axially supported in a fixed part 12*f* close to the rear surface on the inside of the main-body housing section 12 (see FIGS. 12 and 13).

The torsion spring 31, which is the urging member, is disposed to be wound around the second-link lower turning support shaft 13g of the second link 13b. The torsion spring 31 urges the second link 13b to turn around the second-link lower turning support shaft 13g in a clockwise direction in FIG. 12 (a counterclockwise direction in FIG. 13), that is, to always stand with respect to the main-body housing section 12. According to the urging of the second link 13b, the first link 13a is also urged to always stand with respect to the main-body housing section 12.

Although not shown in the figure, a specific example of a configuration for the turn urging of the second link 13b by the torsion spring 31 is as explained below As explained above, the torsion spring 31 is disposed to wound around the second-link lower turning support shaft 13g of the second link 13b. In this case, one end of the torsion spring 31 is locked in a boss section (not shown in the figure) implanted on the second link 13b side. The other end of the torsion spring 31 is locked in a locking convex section formed in a fixed part 12i (see FIGS. 12 and 13) on the inside of the main-body housing section 12. The torsion spring 31 is energized in a state in which the second link 13b is reclined (a nonuse state in which the upper cover member 11 is in the closed position). That is, an urging force of the torsion spring 31 urges the second link 13b around the second-link lower turning support shaft 13g in a direction in which the second link 13b always stands.

On the other hand, in order to restrict the urging of the first link 13a and the second link 13b in the standing direction, a stopper section 12h (see FIGS. 12 and 13) is formed in an inner fixed part of the main-body housing section 12 in a vicinity of the first-link lower turning support shaft 13f of the first link 13a.

When the first link 13a and the second link 13b are urged in a predetermined direction (the standing direction) around the first-link lower turning support shaft 13f and the second-link lower turning support shaft 13g by the urging force of the torsion spring 31 as explained above, a distal end face 13aa of the first link 13a comes into contact with the stopper section 12h soon. Consequently, the urged turning of the first link 13a around the first-link lower turning support shaft 13f is restricted. Therefore, the parallel link mechanism 13 is configured to be stabilized in a predetermined posture. Note that, when the parallel link mechanism 13 is in the stable posture, the sighting device 1 is in the use state, that is, the upper cover member 11 is in the open position.

In the parallel link mechanism 13 configured as explained above, the parallel pair of links (13a, 13b) turn around the respective support shafts (13g, 13f) to thereby translate the upper cover member 11 between the closed position and the open position with respect to the main-body housing section 12. In this case, the upper cover member 11 substantially rises or substantially falls in the direction along the Y axis. At the same time, the upper cover member 11 not only moves in the direction along the Y axis but also moves in the direction along the Z axis.

That is, the upper cover member 11 is configured to, when moving from the closed position to the open position, not only rise in the Y-axis direction with respect to the main-body housing section 12 but also be displaced by a predetermined amount toward the rear surface side (a side where the aiming light source 16b is disposed as explained below) in the Z-axis direction.

A sign [C1] shown in FIG. 7 indicates a position in the Y-axis direction at the time when the upper cover member 11 is in the closed position. A sign [O1] in the figure indicates a position in the Y-axis direction at the time when the upper cover member 11 is in the open position. Therefore, when the upper cover member 11 moves from the closed position to the open position, a movement amount in the Y-axis direction of the upper cover member 11 can be indicated by a sign Y1.

On the other hand, a sign [C2] shown in FIG. 7 indicates a position in the Z-axis direction at the time when the upper cover member 11 is in the closed position. A sign [O2] in the figure indicates a position in the Z-axis direction at the time when the upper cover member 11 is in the open position. Therefore, when the upper cover member 11 moves from the closed position to the open position, a movement amount in the Z-axis direction of the upper cover member 11 can be indicated by a sign Z1. In other words, when the upper cover member 11 moves from the closed position to the open position, the upper cover member 11 is displaced by a movement amount Z1 toward the rear surface side (a side of the aiming light source 16b; explained below) in the Z-axis direction.

Note that, in the present embodiment, as an example of a mechanism for displacing the upper cover member 11 to the open position and the closed position, the parallel link mechanism 13 is illustrated and explained as a multi-joint link mechanism including the plurality of link members. However, a configuration of the mechanism is not limited to this example. Multi-joint link mechanisms of other forms can also be applied. For example, a form can also be applied in which four link members are formed in a diamond shape and expanded and contracted to incline backward a pantograph configured to translate a free end present on an opposed surface of a fixed end.

An angle formed by a straight line passing a first joint section or a second joint section and a straight line passing a third joint section or a fourth joint section and the second joint section is always a right angle. The first, third, and fourth joint sections may be used with a plurality of link mechanisms, diameters of which are present on a predetermined circumference centering on the second joint section, inclined backward.

The mechanism can be a mechanism obtained by combining a rotational motion of swinging of one link section and a shaft sliding lever converted into a linear slide motion in association with the movement of the link section.

[Respective Section's Detailed Configuration: Basic Configuration of the Sighting Device]

Details of a basic configuration in the sighting device 1, more specifically, detailed configurations of the optical element 14, the optical-element holding frame 15, and the aiming light source unit 16 are explained below mainly with reference to FIGS. 5 to 8, 12, 13, and the like.

The optical element 14, the optical-element holding frame 15, and the aiming light source unit 16 are most main constituent members configuring the sighting device 1 of the present embodiment. The sighting device 1 of the present embodiment has a form generally called "dot sight".

The optical element 14 is an optical member having a reflection surface 14a of, for example, a parabolic surface shape or a concave shape approximate to the parabolic surface and formed of, for example, transparent glass or a transparent resin material. As the reflection surface 14a of the optical element 14, a dichroic mirror, a half mirror, or the like that reflects light in a predetermined wavelength region among visible light wavelength regions and transmits lights in wavelength regions other than the predetermined wavelength region is applied. Note that, as an example, the optical element 14 in the sighting device 1 of the present embodiment is formed in a substantially rectangular shape.

The optical-element holding frame 15 is configured to be capable of holding the optical element 14 and displacing a posture between the reclined state during nonuse and the standing state during use. The optical-element holding frame 15 includes a frame-like section of a substantially rectangular frame shape surrounding the optical element 14, leg sections that support the frame-like section, and a turning support shaft 15b that turnably axially supports the leg sections. The turning support shaft 15b is a shaft member implanted in a fixed part on the inside of the main-body housing section 12. The turning support shaft 15b is placed in the direction along the X axis. Therefore, the optical-element holding frame 15 is disposed turnably around the turning support shaft 15b with respect to the inner fixed part of the main-body housing section 12 in a state in which the optical-element holding frame 15 holds the optical element 14.

A torsion spring 32, which is an urging member, is disposed to be wound around the turning support shaft 15b of the optical-element holding frame 15 (see FIG. 12). The torsion spring 32 urges the optical-element holding frame 15 to turn around the turning support shaft 15b in the counterclockwise direction in FIG. 12 (in the clockwise direction in FIG. 13), that is, to always stand with respect to the main-body housing section 12. Note that the torsion spring 32 only has to be present in at least one of the two leg sections of the optical-element holding frame 15. In the present embodiment, as shown in FIG. 12, the torsion spring 32 is disposed in only one of the two leg sections of the optical-element holding frame 15.

A specific example of a configuration for the turn urging of the optical-element holding frame 15 by the torsion spring 32 is explained briefly. As explained above, the torsion spring 32 is disposed to wound around the turning support shaft 15b of the optical-element holding frame 15. In this case, one end of the torsion spring 32 is locked in a boss section (not shown in the figure) implanted on one leg section side of the optical-element holding frame 15. The other end of the torsion spring 32 is locked in a locking convex section 12k (see FIG. 12) formed in the inner fixed part of the main-body housing section 12. The torsion spring 32 is energized in a state in which the optical-element holding frame 15 is reclined (the nonuse state in which the upper cover member 11 is in the closed position; the state shown in FIGS. 5 and 6). That is, an urging force of the torsion spring 32 urges the optical-element holding frame 15 around the turning support shaft 15b in a direction in which the optical-element holding frame 15 always stands.

On the other hand, a stopper section 12j (see FIGS. 5 to 8) for restricting the urging of the optical-element holding frame 15 in the standing direction is formed in the inner fixed part close to a front surface along the Z-axis of the main-body housing section 12. The stopper section 12j is formed in a part opposed to front surfaces of proximal end portions of both the leg sections of the optical-element holding frame 15 when the optical-element holding frame 15 changes to the standing state shown in FIGS. 7 and 8.

With such a configuration, when the optical-element holding frame 15 is urged in a predetermined direction (the standing direction) around the turning support shaft 15b by the urging force of the torsion spring 32 and the optical-element holding frame 15 changes to the standing state shown in FIGS. 7 and 8 as explained above, the front surfaces of the proximal end portions of both the leg sections of the optical-element holding frame 15 come into contact with the stopper section 12j. Consequently, the urged turning of the optical-element holding frame 15 around the turning support shaft 15b is restricted. Therefore, the optical-element holding frame 15 is configured to be stabilized in a predetermined standing posture. Note that, when the optical-element holding frame 15 is in the stable posture, the sighting device 1 is in the use state, that is, the upper cover member 11 is in the open position.

As explained above, when the sighting device 1 is in the nonuse state (when the upper cover member 11 is in the closed position; the state shown in FIGS. 5 and 6), the optical-element holding frame 15 changes to the reclined state to extend along the Z axis on the inside of the main-body housing section 12 and is disposed to be housed in a space between the main-body housing section 12 and the upper cover member 11.

A configuration for displacing the optical-element holding frame 15 from the standing state shown in FIGS. 7 and 8 to the reclined state shown in FIGS. 5 and 6 is as explained below. In the optical-element holding frame 15, a sliding protrusion 15a is formed at an end portion on an opposite side of the turning support shaft 15b (see FIGS. 5 to 8). The sliding protrusion 15a is formed to project toward the front surface side when the optical-element holding frame 15 changes to the standing state. A cross section of a distal end of the sliding protrusion 15a is formed in an R shape or a spherical shape.

When the optical-element holding frame 15 is in the reclined state shown in FIGS. 5 and 6, the sliding protrusion 15a is in contact with an inner surface of the top surface section 11a of the upper cover member 11. That is, in this state, the inner surface of the upper cover member 11 in the closed position comes into contact with the sliding protrusion 15a of the optical-element holding frame 15 to thereby suppress standing power of the optical-element holding frame 15 resisting an urging force of the optical-element holding frame 15 around the turning support shaft 15b.

As explained above, when operation for releasing the closed position lock state is performed by sliding the upper-cover opening lever 17 in the predetermined direction, the upper cover member 11 moves from the closed position shown in FIGS. 5 and 6 to the open position shown in FIGS. 7 and 8. According to the movement of the upper cover member 11, a pressed state of the optical-element holding frame 15 by the upper cover member 11 is also released. Therefore, according to the movement of the upper cover member 11 from the closed position to the open position, the optical-element holding frame 15 turns in a predetermined direction around the turning support shaft 15b with the urging force of the torsion spring 32 and shifts from the reclined state shown in FIGS. 5 and 6 to the standing state shown in FIGS. 7 and 8. At this point, the sliding protrusion 15a of the optical-element holding frame 15 is displaced to the standing state while sliding along the inner surface of the upper cover member 11.

Therefore, on the inner surface of the top surface section 11a of the upper cover member 11, a sliding sheet 29 is provided along the Z axis in a part where the sliding protrusion 15a comes into contact with the inner surface and slides. The sliding sheet 29 is configured by a sheet-like member having a smooth surface such that the sliding protrusion 15a of the upper cover member 11 can easily slide while coming into contact with the sliding sheet 29. Note that the sliding sheet 29 is provided between a part close to the front surface and a predetermined part in the middle of the inner surface of the upper cover member 11 along the Z axis on the inner surface of the upper cover member 11. In this case, the sliding sheet 29 is disposed to have a steep slope in a region close to the front surface along the Z axis on the inner surface of the upper cover member 11.

When the optical-element holding frame 15 changes to the standing state shown in FIGS. 7 and 8, as explained above, the front surfaces of the proximal end portions of both the leg sections come into contact with the stopper section 12*j*, whereby the turning of the optical-element holding frame 15 is restricted and the optical-element holding frame 15 changes to the stable standing state. In this state, the sliding protrusion 15*a* of the optical-element holding frame 15 is separated from the inner surface (the sliding sheet 29) of the upper cover member 11 by a slight distance (see FIGS. 7 and 8). The sliding protrusion 15*a* is set in this way in order to keep the stable standing state of the optical-element holding frame 15. However, it is not always necessary to take such a configuration. The sliding protrusion 15*a* and the inner surface (the sliding sheet 29) of the upper cover member 11 may maintain a contact state.

On the other hand, when the optical-element holding frame 15 is changed from the standing state to the reclined state, the user performs operation for pushing down the top surface section 11*a* of the upper cover member 11 from the upper surface side toward a substantially downward direction along the Y axis with a finger or the like. Then, following the push-down operation, the optical-element holding frame 15 is displaced from the standing state shown in FIGS. 7 and 8 to the reclined state shown in FIGS. 5 and 6. That is, first, the sliding protrusion 15*a* of the optical-element holding frame 15 comes into contact with the sliding sheet 29 on the inner surface of the upper cover member 11. In this state, when the push-down operation of the upper cover member 11 is continued, power for pushing down the R-shaped section of the sliding protrusion 15*a* is applied to the surface of the sliding sheet 29 on the inner surface of the upper cover member 11. As explained above, the steep slope is provided in the region close to the front surface in the Z-axis direction of the sliding sheet 29. Therefore, the R-shaped section of the sliding protrusion 15*a* moves along the steep slope section of the sliding sheet 29, whereby the optical-element holding frame 15 smoothly turns in the predetermined direction and shifts from the standing state to the reclined state.

The optical-element holding frame 15 configured as explained above is disposed turnably around the turning support shaft 15*b* in the part close to the front surface in the direction along the Z axis on the inside of the main-body housing section 12. When the sighting device 1 is changed to the use state shown in FIGS. 7 and 8, the upper cover member 11 is in the open position, and the optical-element holding frame 15 is in the standing state, a space passing through in the direction along the Z axis is formed between the upper cover member 11 and the main-body housing section 12. The optical-element holding frame 15 is disposed in the standing state in a part close to the front surface of the space. In this state, when a look in a forward direction along the Z-axis direction is taken at from the optical path opening 10 (see FIGS. 7 and 8) formed close to the rear surface of the space, a forward visual field can be seen via the optical element 14 held by the optical-element holding frame 15.

In this state (the standing state of the optical-element holding frame 15), the reflection surface 14*a* of the optical element 14 is disposed to be opposed to the aiming light source 16*b* included in the aiming light source unit 16 disposed in the part close to the rear surface in the direction along the Z-axis on the inside of the main-body housing section 12. In this case, the aiming light source 16*b* is disposed in a vicinity of a focal point of the reflection surface 14*a* of the optical element 14. Therefore, with this configuration, after being reflected by the reflection surface 14*a* of the optical element 14, light emitted from the aiming light source 16*b* travels toward the optical path opening 10 on the rear surface side in the space between the upper cover member 11 and the main-body housing section 12. Consequently, the user can visually recognize an image of a form obtained by superimposing a light point emitted from the aiming light source 16*b* and reflected by the reflection surface 14*a* on a forward visual field image that can be observed via the optical element 14 (explained in detail below).

A configuration of the aiming light source unit 16 is explained below mainly with reference to FIGS. 5 to 8, 14 to 19, and the like.

The aiming light source unit 16 is a constituent unit including the aiming light source 16*b* that emits aiming light toward the reflection surface 14*a* of the optical element 14 and an electric circuit that drives the aiming light source 16*b*. Note that the aiming-light-source adjusting mechanism 50 is integrally disposed in a part close to the bottom surface of the aiming light source unit 16 (explained in detail below).

The aiming light source unit 16 is disposed in a part close to the rear surface along the Z axis on the inside of the main-body housing section 12. In this case, one end close to the front surface of the aiming light source unit 16 is turnably axially supported by a support shaft 16*a* placed in the direction along the X axis with respect to the fixed part on the inside of the main-body housing section 12.

On the other hand, the other end close to the rear surface of the aiming light source unit 16 is urged toward the bottom surface side in the Y-axis direction by a taut coil spring 33, which is an urging member, as explained below (see FIG. 14, etc.). One end of the coil spring 33 is locked by a locking section 16*c* on the lower surface of the aiming light source unit 16. The other end of the coil spring 33 is locked by a locking section 50*a* of a main-body fixing section 50*b* of the aiming-light-source adjusting mechanism 50 integrally disposed on the bottom surface side of the aiming light source unit 16. Consequently, the coil spring 33 urges the other end of the aiming light source unit 16 toward a side of the aiming-light-source adjusting mechanism 50, that is, toward the bottom surface side in the Y-axis direction.

As the aiming light source 16*b*, a light emitting member that emits dot-like light, for example, a light emitting diode (LED) is applied. Note that a light source shape of the aiming light source 16*b* is not limited to the dot-like shape and may be other forms. For example, various shapes such as a cross mark, a circle mark, a double circle mark, a mark obtained by superimposing the cross and the circle, and a scale shape are conceivable. Further, these plural marks may be selectable.

The aiming light source 16*b*, the electric circuit for driving the aiming light source 16*b*, and the like are disposed in a vicinity of the other end close to the rear surface on the inside of the aiming light source unit 16. The aiming light source 16*b* is disposed to be capable of emitting aiming light toward the reflection surface 14*a* of the optical element 14 when the sighting device 1 is set in the use state (see FIGS. 7 and 8) and the optical-element holding frame 15 is in the standing state.

In the sighting device 1 of the present embodiment, as explained above, the reflection surface 14*a* of the optical element 14 is formed by, for example, a dichroic mirror. Therefore, the reflection surface 14*a* reflects light in a predetermined wavelength band included in a wavelength of the aiming light emitted from the aiming light source 16*b* and transmits lights in other wavelength bands.

For example, it is assumed that a light emitting diode (LED) that emits red light is applied as the aiming light source 16*b* in the sighting device 1 of the present embodiment. In this case, more specifically, the reflection surface 14*a* reflects a wavelength band of red emitted from the aiming light source 16*b* and transmits lights in wavelength bands of blue and green.

Consequently, in the use state of the sighting device 1, when the user looks forward from the optical path opening 10, the user can visually recognize an image of a form obtained by superimposing a light point emitted from the aiming light source 16*b* and reflected by the reflection surface 14*a* on a forward visual field image that can be observed via the optical element 14.

Incidentally, when the sighting device 1 of the present embodiment is used, it is necessary to perform predetermined adjustment in a state in which the sighting device 1 is connected and fixed to an attachment section (an accessory shoe, etc.; not shown in the figure) of an apparatus in use in which the sighting device 1 is used. The predetermined adjustment is adjustment for substantially matching the positional relation between an optical path of the aiming light source 16*b* in the sighting device 1 and an image pickup or observation direction by the apparatus in use (e.g., when the apparatus in use is an image pickup apparatus, an optical axis of an image pickup optical system of the image pickup apparatus).

More specifically, the predetermined adjustment is adjustment for, in a state in which the sighting device 1 is attached to the apparatus in use (the image pickup apparatus), setting the sighting device 1 in the use state and substantially matching a forward visual field image seen from the optical path opening 10 and a position of a light point superimposed and visually recognized on the forward visual field image and a picked-up image picked up or observed by an image pickup optical system of the apparatus in use (the image pickup apparatus) and a position of a substantially center point of the picked-up image.

The position adjustment can be performed by, in a state in which the sighting device 1 is attached to the apparatus in use (the image pickup apparatus), adjusting positions in the X-axis direction and the Y-axis direction of the aiming light source 16*b*, more specifically, an emitting direction of the aiming light of the aiming light source 16*b*. Therefore, the aiming-light-source adjusting mechanism 50 is provided in the sighting device 1 of the present embodiment.

[Respective Section's Detailed Configuration: Aiming-Light-Source Adjusting Mechanism]

A detailed configuration of the aiming-light-source adjusting mechanism 50 in the sighting device 1 is explained below mainly with reference to FIGS. 14 to 19.

The aiming-light-source adjusting mechanism 50 is configured by an X-axis adjusting mechanism that performs position adjustment in the X-axis direction of the aiming light source unit 16 and a Y-axis adjusting mechanism that performs position adjustment in the Y-axis direction of the aiming light source unit 16. As explained above, the aiming-light-source adjusting mechanism 50 is integrally disposed on the bottom surface side of the aiming light source unit 16.

The X-axis adjusting mechanism is configured by an X-axis-direction adjustment dial 51*x*, an X-axis-adjustment feed screw 52*x*, a female screw section 53*x*, a backlash removing spring 54*x*, and the like.

The X-axis-direction adjustment dial 51*x* is an operation member for performing position adjustment in the X-axis direction of the aiming light source unit 16. The X-axis-direction adjustment dial 51*x* is provided such that a part of the X-axis-direction adjustment dial 51*x* is exposed to the outside in a part close to the rear surface on the right side surface (the right sidewall 11*b*) of the main-body housing section 12. The X-axis-direction adjustment dial 51*x* is disposed rotatably around the X-axis with respect to the main-body housing section 12. A rotation-center axis member of the X-axis-direction adjustment dial 51*x* is inserted into the inside of the main-body housing section 12 and rotatably axially supported by a part of the main-body fixing section 50*b* of the aiming-light-source adjusting mechanism 50.

The X-axis-adjustment feed screw 52*x* is provided coaxially with the X-axis-direction adjustment dial 51*x*. The X-axis-adjustment feed screw 52*x* is screwed in the female screw section 53*x* integrally formed in a predetermined part of the main-body fixing section 50*b*. Consequently, the rotation-center axis member of the X-axis-direction adjustment dial 51*x* including the X-axis-adjustment feed screw 52*x* is rotatably axially supported in the female screw section 53*x*.

As explained above, the female screw section 53*x* is formed in the predetermined part of the main-body fixing section 50*b*, screws with the X-axis-adjustment feed screw 52*x*, and rotatably axially supports the X-axis-adjustment feed screw 52*x*.

The backlash removing spring 54*x* is an urging member provided between the main-body fixing section 50*b* and the X-axis-direction adjustment dial 51*x* in order to remove attachment backlash in the X-axis direction of the X-axis-direction adjustment dial 51*x*. For example, a coil spring having extensibility in the X-axis direction is applied.

The X-axis adjusting mechanism configured as explained above acts as explained below. When the user regularly and reversely rotates the X-axis-direction adjustment dial 51*x*, the X-axis-adjustment feed screw 52*x* also rotates in the same directions in association with the rotation of the X-axis-direction adjustment dial 51*x*. The female screw section 53*x* integrally formed in the main-body fixing section 50*b* is screwed with the X-axis-adjustment feed screw 52*x*. Consequently, when the X-axis-adjustment feed screw 52*x* rotates in a predetermined direction, the main-body fixing section 50*b* moves in a direction along the X-axis. Consequently, it is possible to move the aiming light source unit 16 in the direction along the X axis. Therefore, it is possible to perform position adjustment in the X-axis direction of the aiming light source unit 16.

The Y-axis adjusting mechanism is configured by a Y-axis-direction adjustment dial 51*y*, a Y-axis-adjustment gear train 52*y*, a Y-axis-adjustment cam 53*y*, a coil spring 33, a cam follower 16*y*, and the like. The Y-axis-direction adjustment dial 51*y* is an operation member for performing position adjustment in the Y-axis direction of the aiming light source unit 16. The Y-axis-direction adjustment dial 51*y* is provided such that a part of the Y-axis-direction adjustment dial 51*y* is exposed to the outside in a part close to the rear surface on the left side surface (the left sidewall 11*c*) of the main-body housing section 12. The Y-axis-direction adjustment dial 51*y* is disposed rotatably around the X axis with respect to the main-body housing section 12. A rotation-center axis member of the Y-axis-direction adjustment dial 51*y* is inserted into the inside of the main-body housing section 12 and rotatably axially supported in a not-shown fixed part. Note that the Y-axis-direction adjustment dial 51*y* and the X-axis-direction adjustment dial 51*x* are disposed to be opposed to each other across the Z axis in the main-body housing section 12.

A gear is coaxially fixed in the Y-axis-direction adjustment dial 51y. The gear configures a part of the Y-axis-adjustment gear train 52y configured by a plurality of gears. Coaxially with a last output gear of the Y-axis-adjustment gear train 52y, the Y-axis-adjustment cam 53y having a cam surface of a predetermined shape is rotatably axially supported with respect to a predetermined fixed part (not shown in the figure) to be parallel to the X-axis.

A distal end of the cam follower 16y projected downward from a bottom surface section of the aiming light source unit 16 is in contact with the cam surface of the Y-axis-adjustment cam 53y.

Note that, as explained above, the aiming light source unit 16 is always urged toward the bottom surface side in the Y-axis direction by the taut coil spring 33 (see FIG. 14, etc.). Consequently, the distal end of the cam follower 16y is always in contact with the cam surface of the Y-axis-adjustment cam 53y. The coil spring 33 is provided between the locking section 50a of the main-body fixing section 50b and the aiming light source unit 16 and functions as backlash removing means for removing movable backlash in the Y-axis direction of the aiming light source unit 16.

The Y-axis adjusting mechanism configured as explained above acts as explained below. When the user regularly and reversely rotates the Y-axis-direction adjustment dial 51y, the Y-axis-adjustment cam 53y rotates in a predetermined direction around the X axis via the Y-axis-adjustment gear train 52y in association with the rotation of the Y-axis-direction adjustment dial 51y. Then, the aiming light source unit 16 moves in the direction along the Y axis via the cam follower 16y that is in contact with the cam surface of the Y-axis-adjustment cam 53y. At this point, the aiming light source unit 16 turns around the support shaft 16a. As a result, the aiming light source unit 16 is moved in the direction along the Y axis. Consequently, it is possible to perform position adjustment in the Y-axis direction of the aiming light source unit 16.

[Respective Section's Detailed Configuration: Illuminance Adjusting Section]

A detailed configuration of the illuminance adjusting section 20 in the sighting device 1 is explained below mainly with reference to FIGS. 9 and 10.

The illuminance adjusting section 20 is a constituent section that adjusts illuminance of the aiming light source 16b. In the present embodiment, the adjustment of the illuminance of the aiming light source 16b is performed by changing electric resistance. The illuminance adjusting section 20 in the present embodiment is configured to also function as a changeover switch for performing ON and OFF of a power supply state.

The illuminance adjusting section 20 is configured by electric circuits, electric components, and the like including the power-supply-ON/OFF and illuminance adjustment dial 21, a click plate 22, a click convex section 23, a sliding segment 24, a flexible printed (FPC) board 25, an FPC table plate 26, and a contact plate 28.

The power-supply-ON/OFF and illuminance adjustment dial (hereinafter simply referred to as illuminance adjustment dial) 21 is an operation member for performing ON/OFF switching of a power supply and switching for illuminance adjustment. The illuminance adjustment dial 21 is provided such that a part of the illuminance adjustment dial 21 is exposed to the outside in a part close to the front surface on the right side surface (the right sidewall 11b) of the main-body housing section 12. The illuminance adjustment dial 21 is attached by, for example, a not-shown screw to be rotatable around the X axis with respect to a fixed part 12m (see FIG. 10) of the main-body housing section 12.

Note that, in this case, as shown in FIG. 10, sealing treatment for disposing an O-shaped ring 27 or the like is applied between a rotating shaft section 21a of the illuminance adjustment dial 21 and the fixed part 12m of the main-body housing section 12. Consequently, the illuminance adjustment dial 21 includes a dustproof and drip-proof structure capable of suppressing intrusion of water drops, dust, and the like into the inside.

On the inside of the main-body housing section 12, the click plate 22 is integrally fixed at an end portion of the illuminance adjustment dial 21. In the click plate 22, a plurality of click holes are formed to be arranged on a circumference at a predetermined interval. A click convex section 23 is fixed in a part opposed to the circumference on which the plurality of click holes are arranged on the click plate 22, that is, the inner fixed part of the main-body housing section 12. Therefore, the click plate 22 rotates in the same direction according to rotating operation of the illuminance adjustment dial 21. According to the rotation, the click convex section 23 moves into and out of the plurality of click holes of the click plate 22 to generate a click feeling. Consequently, the illuminance adjustment dial 21 is configured to be capable of performing the rotating operation involving the click feeling.

The contact plate 28 including an electric contact is integrally disposed on an outer surface of the click plate 22. A sliding segment 24 is fixed on a side of the inner fixed part of the main-body housing section 12 to be opposed to the contact plate 28. The sliding segment 24 is electrically connected to the flexible printed (FPC) board 25. The flexible printed board 25 is stuck and fixed to, using a double-coated adhesive tape or the like, the table plate 26 fixed to the inner fixed part of the main-body housing section 12 using, for example, a screw.

[Respective Section's Detailed Configuration: Battery-Lid Opening and Closing Mechanism]

A detailed configuration of the battery-lid opening and closing mechanism of the main-body housing section 12 in the sighting device 1 is explained below mainly with reference to FIGS. 5 to 8 and the like.

As explained above, on the inside of the main-body housing section 12, the battery housing chamber 12a having the space in the predetermined region for housing the power supply battery 60 is formed in the predetermined region on the bottom surface side, that is, the region close to the front along the Z axis. The battery lid 12b is disposed in an opening of the battery housing chamber 12a.

In a region in the bottom surface section of the main-body housing section 12, that is, a region close to the front surface along the Z axis, the battery lid 12b is formed to cover the opening of the battery housing chamber 12a from an outer side and to be detachably attachable to the bottom surface section of the main-body housing section 12.

In this case, the user performs operation for sliding the battery lid 12b in the direction along the Z axis with respect to the main-body housing section 12, whereby the battery lid 12b performs opening and closing of the opening of the battery housing chamber 12a.

More specifically, when the opening of the battery housing chamber 12a is in the closed state (in a state in which the battery lid 12b is attached to a predetermined part on the bottom surface side of the main-body housing section 12), the user can change the opening of the battery housing chamber 12a to the open state by sliding the battery lid 12b to the front surface side along the Z axis. To change the opening of the battery housing chamber 12a to the closed state and attach the battery lid 12b to the predetermined part on the bottom surface side of the main-body housing section 12, the user slides the battery lid 12b from the front surface side to the rear surface side along the Z axis.

Note that, in a vicinity of the battery housing chamber 12a, the battery-lid opening and closing mechanism for maintaining the closed state of the battery lid 12b and releasing a lock state of the battery lid 12b to change the battery lid 12b in the closed state to the open state is provided. The battery-lid opening and closing mechanism is mainly configured by a battery-lid opening operation button 12c and an urging spring 12d.

The battery-lid opening operation button 12c is made of, for example, a metal shaft-like member and is disposed to be capable of projecting and retracting with respect to a fixed member in a vicinity of the battery lid 12b in an axial direction orthogonal to an opening and closing direction of the battery lid 12b. The battery-lid opening operation button 12c is disposed to be slightly projected from an outer surface of the fixed member of the main-body housing section 12 by an urging force of the urging spring 12d such as an extensible coil spring. To correspond to the battery-lid opening operation button 12c, in a region of the battery lid 12b, a fitting hole 12p in which a projecting section of the battery-lid opening operation button 12c is fit when the battery lid 12b closes the battery housing chamber 12a is drilled. The fitting hole 12p pierces through the battery lid 12b.

With such a configuration, when the battery lid 12b is in the closed state, the projecting section of the battery-lid opening operation button 12c fits in the fitting hole 12p, whereby the closed state of the battery lid 12b is maintained.

On the other hand, in order to release the closed state of the battery lid 12b, the user performs operation explained below. The user pushes down the projecting section of the battery-lid opening operation button 12c into the inside resisting the urging force of the urging spring 12d using an existing tapered bar-like member (more specifically, a pen nib of a pencil, a ballpoint pen, or the like or a member such as a toothpick) via the fitting hole 12p from the outer surface side of the battery lid 12b. Then, a locked state of the battery lid 12b by the battery-lid opening operation button 12c is released. The battery lid 12b is capable of sliding toward a Z-direction front surface side. Therefore, the user slides the battery lid 12b toward the Z-direction front surface side while maintaining a pushed-down state of the battery-lid opening operation button 12c. Consequently, the battery lid 12b separates from the bottom surface of the main-body housing section 12. The opening of the battery housing chamber 12a changes to the open state.

Therefore, in this state, the user can perform, for example, operation for housing the power supply battery 60 of a form matching the sighting device 1 in the battery housing chamber 12a and battery replacement operation for removing the power supply battery 60 already housed in the battery housing chamber 12a and then mounting a new power supply battery 60.

Note that, as the power supply battery 60 housed in the battery housing chamber 12a, for example, a primary battery called button type or coin type is applied.

[Action]

For example, as shown in FIG. 20, the sighting device 1 of the present embodiment configured as explained above can be attached to an accessory shoe 103, which is an accessory attaching section, of a desired apparatus in use such as an image pickup apparatus 100 and, after predetermined adjustment is properly performed, served for actual use.

A configuration of the image pickup apparatus 100 functioning as the apparatus in use is briefly explained. As shown in FIG. 20, the image pickup apparatus 100 is configured by a main body section 101 having a box shape and a lens barrel 102 having a cylindrical shape. Although not shown in the figure, a plurality of operation members such as a shutter release button and a power ON/OFF button are provided on an upper surface of the main body section 101. Various accessory devices, for example, the accessory shoe 103 for enabling the sighting device 1 of the present embodiment, a general-purpose flashing device, and the like to be attached and detached are disposed in a substantially center portion of the upper surface of the main body section 101. On a rear surface of the main body section 101, a plurality of operation members (not shown in the figure) including, for example, a switching dial for an image pickup mode are provided. Further, a display device 104 that displays a live view image during an image pickup operation and displays a picked-up image is disposed with a display surface thereof directed to a rear surface outward direction.

The lens barrel 102 is provided on a front surface of the main body section 101 and disposed to project forward. The lens barrel 102 is configured by an image pickup optical system including a plurality of optical lenses, a plurality of barrel members that respectively hold the plurality of optical lenses, a driving mechanism for driving to advance and retract a part of the plurality of barrel members in a direction along an optical axis of the image pickup optical system. As a configuration of the lens barrel 102, the lens barrel 102 may be fixed to the front surface of the main body section 101 or may be detachably attachable to the front surface of the main body section 101.

The accessory shoe 103 is an attachment part configured to be capable of holding the connecting and fitting section 18, which is provided in a common form in the sighting device 1 and other external devices, in a form in which a pair of holding sections, cross sections of which are formed in a channel shape, are respectively disposed to be opposed to each other. The accessory shoe 103 is formed mainly using a conductive metal member.

On an upper surface of the image pickup apparatus 100, a plurality of electric contacts (not shown in the figure) are provided in a part surrounded by the pair of holding sections of the accessory shoe 103. The plurality of electric contacts are connected to an electric circuit provided on an inside of the main body section 101. The plurality of electric contacts are disposed in positions with which the contact 18a on the sighting device 1 side comes into contact when the sighting device 1 is attached to the image pickup apparatus 100, that is, the connecting and fitting section 18 is disposed to be fit in the accessory shoe 103. Therefore, by electrically connecting the image pickup apparatus 100 and the sighting device 1, the plurality of electric contacts and the contact 18a function as, for example, means for supplying electric power from the main body section 101 side to the sighting device 1 side and performing signal communication for, for example, communicating an operation state of the aiming light source 16b on the sighting device 1 side to a control section (not shown in the figure) on the main body section 101 side.

The sighting device 1 of the present embodiment is attached to the image pickup apparatus 100 configured as explained above by fitting the connecting and fitting section 18 of the sighting device 1 in the accessory shoe 103 on the upper surface of the image pickup apparatus 100. The attached sighting device 1 is changed to the use state according to the procedure explained above.

First, the user slides the upper-cover opening lever 17 of the sighting device 1 in the predetermined direction to release the closed position lock state of the upper cover member 11. Consequently, the upper cover member 11 moves from the closed position shown in FIGS. 5 and 6 and the open position shown in FIGS. 7 and 8. At the same time, the optical-element holding frame 15 is displaced from the reclined state to the standing state. In this way, the sighting device 1 is displaced from the nonuse state to the use state. The user changes the image pickup apparatus 100 and the sighting device 1 to a power ON state in which the image pickup apparatus 100 and the sighting device 1 are usable. The state at this point is the state shown in FIG. 20.

In this state, first, the user performs predetermined adjustment of the sighting device 1 with respect to the image pickup apparatus 100. As explained above, the predetermined adjustment is adjustment for substantially matching the optical path of the aiming light source 16b of the sighting device 1 and an optical axis of an image pickup optical system of the image pickup apparatus 100.

More specifically, the predetermined adjustment is adjustment for, in a state in which the sighting device 1 is attached to the image pickup apparatus 100, substantially matching a forward visual field image seen from the optical path opening 10 of the sighting device 1 in the use state and a position of a light point superimposed and visually recognized on the forward visual field image and a substantially center point position of a display image picked up or observed by the image pickup optical system of the image pickup apparatus 100 and displayed on a display screen of the display device 104.

By performing the adjustment, an extended line of the optical path of the light point superimposed and visually recognized on the forward visual field image of the optical element 14 of the sighting device 1 and an extended line of the optical axis of the image pickup optical system of the image pickup apparatus 100 are set in substantially parallel to each other. When the sighting device 1 and the image pickup apparatus 100 are adjusted in this way, when the light point superimposed and visually recognized on the forward visual field image of the optical element 14 of the sighting device 1 is superimposed on a desired object image, it is possible to capture the desired object image in an image pickup screen on the display screen of the display device 104 of the image pickup apparatus 100.

After performing such adjustment, the user thins the desired object image using the sighting device 1 and executes an image pickup operation. That is, in the apparatus in the state shown in FIG. 20, the user visually recognizes the optical element 14 via the optical path opening 10 from the rear surface side of the sighting device 1. At this point, the user can visually recognize an observation image in a predetermined range including the desired object image and a light point of the aiming light source 16b through the optical element 14. The user optionally moves the apparatus in use (the image pickup apparatus) attached with the sighting device 1 while looking into the optical path opening 10, performs rough composition setting (framing) such that the desired object image is included in an observation range observed through the optical element 14, and further performs fine adjustment of the composition setting (framing) such that the desired object image and the light point of the aiming light source 16b overlap.

When the desired object image and the light point overlap, the desired object image is captured in an image pickup range displayed on the display device 104 on the image pickup apparatus 100 side. Therefore, in this state, the user performs final composition setting (framing) for image pickup using the display device 104 of the image pickup apparatus 100 and executes predetermined image pickup operation such as depression of the shutter release button at desired timing. Consequently, it is possible to surely pick up the desired object image.

As explained above, according to the embodiment, in the nonuse state of the sighting device 1, the upper cover member 11 and the main-body housing section 12 are configured to fit with each other to cover the openings (11x, 12x) thereof and to be integrated. Therefore, it is possible to protect internal constituent members, contribute to a reduction in the size of the sighting device, and improve portability.

On the other hand, in the use state of the sighting device 1, the upper cover member 11 is moved to above the main-body housing section 12 by the parallel link mechanism 13 and disposed in a predetermined position separated from the main-body housing section 12. Therefore, during the use of the sighting device 1, it is possible to block, with the top surface section 11a of the upper cover member 11, in particular, incident light from above among unnecessary lights made incident in the optical path of the aiming light source 16b from the outside. Further, in addition, by contriving the shape of the upper cover member 11, it is possible to block unnecessary light into the optical path of the aiming light source 16b and secure a satisfactory visual field from the optical path opening 10 of the sighting device 1 without a part of the upper cover member 11 hindering a visual field.

More specifically, for example, on both the left and right sidewalls (11b, 11c), the region 11bb close to the rear surface along the Z axis is cut out with respect to the other region 11ba. The opening visual fields on both the side directions close to the rear surface are secured in the direction along the optical path opening 10 during the use. The cutout 11da of the front surface wall 11d secures the opening visual field in an upper part of the front surface side in the direction along the optical path opening 10. The cutout 11ea of the rear surface wall 11e secures the opening visual field in an upper part of the rear surface side in the direction along the optical path opening 10.

Further, on the front surface wall of the main-body housing section 12, by forming the front surface cutout 12e, the opening visual fields in the front surface side downward direction and the both side directions of the front surface side downward direction are secured in the direction along the optical path opening 10.

In addition, further, in the present embodiment, when the upper cover member 11 is moved from the closed position to the open position, the upper cover member 11 not only rises in the Y-axis direction with respect to the main-body housing section 12 but also is displaced toward the rear surface side (the side where the aiming light source 16b is disposed) by the predetermined amount (the sign Z1 in FIG. 7) in the Z-axis direction. With these configurations, in the sighting device 1 of the present embodiment, it is possible to perform blocking of unnecessary light into the optical path of the aiming light source 16b while securing a satisfactory visual field of the optical path opening 10.

Therefore, even when the sighting device 1 is used in an environment such as under sunlight outdoors in daytime, it is possible to always surely visually recognize the light point (referred to as reticle or aiming mark) of the aiming light source 16*b* and an object observation image. Therefore, it is possible to contribute to improvement of visibility.

On the other hand, in order to displace the sighting device 1 from the use state to the nonuse state, the user can realize the displacement with simple operation of only directing the top surface section 11*a* of the upper cover member 11 from the upper surface side to the substantially downward direction along the Y axis and pushing down the top surface section 11*a* with fingers or the like resisting the urging force of the torsion spring 31 of the parallel link mechanism 13 until the locked section 11*f* is locked by the locking claw section 30*a*.

[Modification]

Incidentally, in the sighting device 1 of the embodiment, the battery housing chamber 12*a* is formed in a region of the main-body housing section 12 and the battery lid 12*b* for opening and closing the battery housing chamber 12*a* is provided. The sighting device 1 includes the power supply section including the power supply battery 60.

As a modification of the sighting device 1 of the embodiment having such a form, it is conceivable to omit the power supply section including the power supply battery 60.

When such a configuration is adopted, supply of electric power to the sighting device only has to be received from a power supply section (not shown in the figure) of the apparatus in use (the image pickup apparatus, etc.) connected via the contact 18*a* in the connecting mechanism. Therefore, for example, the apparatus in use (the image pickup apparatus, etc.) side corresponding to a sighting device of the modification is configured to include control for checking an attachment state of the sighting device and, when it is confirmed that the sighting device is attached, starting power supply from the power supply section of the apparatus in use side to the sighting device side via the contact 18*a*. Note that, in the configuration of the modification, the switching function for power ON/OFF included in the illuminance adjusting section 20 may be omitted. The other components are configured substantially the same as the components in the embodiment.

According to the modification having such a form, it is possible to omit the power supply section including the power supply battery 60. Therefore, it is possible to contribute to a further reduction in the size of the sighting device itself. Further, it is possible to cause the sighting device to function with the power supply from the apparatus in use side and use the sighting device. Therefore, it is unnecessary to separately prepare a power supply battery on the sighting device side.

[Another Modification]

On the other hand, separately from the sighting device of the modification, another modification having a form explained below is also conceivable. A sighting device in the other modification explained here has a configuration substantially the same as the configuration of the sighting device 1 of the embodiment. Further, the sighting device performs control for distinguishing a case in which a power supply state on the sighting device side is an OFF state or a case in which the aiming light source 16*b* cannot be sufficiently driven because, for example, the power supply battery 60 on the sighting device side is exhausted and, only when state distinction to that effect is performed, enabling the power supply to be received from the apparatus in use (the image pickup apparatus, etc.) side.

When such a configuration is adopted, the distinction of ON and OFF states of the power supply state or the check of an exhaustion state of the power supply battery 60 may be performed, for example, in the power supply section on the sighting device side or may be performed by the power supply section, the control circuit, or the like on the apparatus in use (the image pickup apparatus, etc.) side.

According to the other modification having such a form, irrespective of the power supply state on the sighting device side or the exhaustion state of the power supply battery 60, it is possible to always supply necessary power to the sighting device. Therefore, it is possible to surely attach the sighting device 1 to the apparatus in use and use the sighting device 1.

Note that the present invention is not limited to the embodiment explained above. It goes without saying that various modifications and applications can be carried out without departing from the spirit of the invention. That is, an apparatus to which the sighting device of the present invention is attached to be used is not limited to only the image pickup apparatus such as the camera (including the digital camera and the digital video camera) illustrated in the embodiment mentioned above and can also be applied to, for example, a display apparatus for observation including a panel for display that displays an enlarged image obtained using an optical lens and an image pickup device or an optical apparatus for observation such as a telescope (including a field scope, a spotting scope, and binoculars).

Inventions in various stages are included in the embodiment. Various inventions can be extracted according to appropriate combinations in the disclosed plurality of constituent elements. For example, when the problem to be solved by the invention can be solved and the effects of the invention can be obtained even if several constituent elements are deleted from all the constituent elements explained in the embodiment, a configuration in which the constituent elements are deleted can be extracted as the invention. Further, the constituent elements explained in different embodiments may be combined as appropriate.

What is claimed is:

1. A sighting device including an optical element having a concave reflection surface and an aiming light source that emits aiming light toward the concave reflection surface of the optical element, the sighting device forming a light point of the aiming light emitted from the aiming light source in a visual field frame, the sighting device comprising:
a main-body housing section that houses the optical element and the aiming light source and has an opening on an upper surface side;
a cover member that covers the upper surface side of the main-body housing section; and
a link mechanism that couples the main-body housing section and the cover member and moves the cover member with respect to the main-body housing section, wherein
the cover member is moved by the link mechanism between a closed position where the cover member covers the opening on the upper surface side of the main-body housing section and an open position where the cover member is disposed in a position separated from the opening on the upper surface side of the main-body housing section to lie above the main-body housing section and forms an optical path opening along an optical path of the aiming light emitted from the aiming light source on an inside of the main-body housing section.

2. The sighting device according to claim 1, wherein the cover member further includes a sidewall section that covers, when the cover member is disposed in the open position, a part of both side surfaces along the optical path of the aiming light emitted from the aiming light source.

3. The sighting device according to claim 1, wherein the cover member is displaced further to a side where the aiming light source is disposed in a direction along the optical path opening when the cover member is disposed in the open position than when the cover member is in the closed position.

4. The sighting device according to claim 1, wherein the optical element stands and reclines following the movement of the cover member.

5. The sighting device according to claim 4, wherein
when the cover member is in the open position, the optical element is set in a standing state on the inside of the main-body housing section and disposed such that the reflection surface is opposed to the aiming light source, and
when the cover member is in the closed position, the optical element is set in a reclined state on the inside of the main-body housing section and disposed to be housed such that the reflection surface is substantially parallel to a surface including the opening of the main-body housing section.

6. The sighting device according to claim 4, wherein
when the cover member is in the open position, the optical element is set in a standing state on the inside of the main-body housing section and disposed such that the reflection surface is substantially orthogonal to an optical path of the aiming light, and
when the cover member is in the closed position, the optical element is set in a reclined state on the inside of the main-body housing section and disposed to be housed such that the reflection surface is substantially parallel to the optical path of the aiming light.

7. The sighting device according to claim 1, wherein a power supply section is further provided on the inside of the main-body housing section.

8. The sighting device according to claim 7, wherein the power supply section is disposed further on a bottom surface side than a part where the optical element is disposed on the inside of the main-body housing section.

9. The sighting device according to claim 1, wherein the main-body housing section further includes an accessory attaching section.

10. The sighting device according to claim 9, wherein
the accessory attaching section further includes an electric contact, and
when the sighting device is mounted on an external apparatus via the accessory attaching section, the sighting device receives power supply from the external apparatus via the electric contact.

11. The sighting device according to claim 1, further comprising a light-source-position adjusting mechanism that performs position adjustment of the aiming light source.

12. The sighting device according to claim 11, wherein the light-source-position adjusting mechanism displaces a position of the aiming light source independently in two directions, which are a direction parallel to the optical path of the aiming light emitted from the aiming light source and a direction orthogonal to the optical path.

* * * * *